United States Patent
Takasugi et al.

(10) Patent No.: US 9,172,986 B2
(45) Date of Patent: Oct. 27, 2015

(54) NETWORK SYSTEM, COMMUNICATION METHOD, AND COMMUNICATION TERMINAL

(75) Inventors: Masahide Takasugi, Osaka (JP); Masaki Yamamoto, Osaka (JP); Misuzu Kawamura, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 117 days.

(21) Appl. No.: 13/638,517

(22) PCT Filed: Mar. 8, 2011

(86) PCT No.: PCT/JP2011/055379
§ 371 (c)(1), (2), (4) Date: Sep. 28, 2012

(87) PCT Pub. No.: WO2011/122266
PCT Pub. Date: Oct. 6, 2011

(65) Prior Publication Data
US 2013/0024537 A1 Jan. 24, 2013

(30) Foreign Application Priority Data
Mar. 30, 2010 (JP) ................................ 2010-077781

(51) Int. Cl.
*G06F 15/16* (2006.01)
*G06F 3/041* (2006.01)
(Continued)

(52) U.S. Cl.
CPC ... *H04N 21/25816* (2013.01); *H04N 21/41407* (2013.01); *H04N 21/4333* (2013.01); *H04N 21/4788* (2013.01); *H04N 21/6587* (2013.01)

(58) Field of Classification Search
USPC ........................................................ 709/206
See application file for complete search history.

(56) References Cited

U.S. PATENT DOCUMENTS

| 8,594,740 B2 * | 11/2013 | Wang et al. .................. 455/566 |
| 2005/0166242 A1 | 7/2005 | Matsumoto et al. |

(Continued)

FOREIGN PATENT DOCUMENTS

| JP | 4-252447 A | 9/1992 |
| JP | 2005-208710 A | 8/2005 |

(Continued)

OTHER PUBLICATIONS

Botteck, M.; Steinke, B.; Muller, K.; Hermann, J., "Personal networks and Multimedia rendering," Consumer Electronics, 2008. ISCE 2008. IEEE International Symposium on , vol., no., pp. 1,4, Apr. 14-16, 2008 doi: 10.1109/ISCE.2008.4559523, pp. 1-4.*

(Continued)

*Primary Examiner* — Jeffrey R Swearingen
*Assistant Examiner* — Messeret Gebre
(74) *Attorney, Agent, or Firm* — Birch, Stewart, Kolasch & Birch, LLP

(57) ABSTRACT

A communication terminal includes a touch panel, a communication device for communicating with an other communication terminal, and a processor for reproducing contents using a touch panel, temporarily stopping reproduction of the contents and transmitting a stop instruction to the other communication terminal according to a first input, resuming the reproduction of the contents and transmitting the resumption instruction to the other communication terminal according to a second input, temporarily stopping the reproduction of the contents according to a stop instruction from the other communication terminal, and resuming the reproduction of the contents according to a resumption instruction from the other communication terminal.

14 Claims, 23 Drawing Sheets

(51) Int. Cl.
*H04N 21/258* (2011.01)
*H04N 21/414* (2011.01)
*H04N 21/433* (2011.01)
*H04N 21/4788* (2011.01)
*H04N 21/6587* (2011.01)

(56) References Cited

U.S. PATENT DOCUMENTS

2008/0177822 A1* 7/2008 Yoneda .................. 709/202
2011/0072394 A1* 3/2011 Victor .................... 715/821
2011/0301728 A1* 12/2011 Hamilton et al. ........ 700/94

FOREIGN PATENT DOCUMENTS

JP 2006-4190 A 1/2006
JP 2009-71379 A 4/2009

OTHER PUBLICATIONS

A Multitouch Software Architecture; Florian Echtler and Gudrun Klinker; Technische Universität München Institut für Informatik; Boltzmannstr. 3; D-85747 Garching, Germany-2008, pp. 1-4.*
Understanding the Flow of Content in Summarizing HTML Documents; A. F. R. Rahman, H. Alam and R. Hartono Document Analysis and Recognition Team (DART); BCL Computers Inc. 2001, pp. 1-4.*

* cited by examiner (a)

| ROOM NAME | TERMINAL INFORMATION (IP ADDRESS) |
|---|---|
| R | A |
| S | B |
| R | C |
| T | D |
|  |  |
|  |  |

~406A (b)

| ROOM NAME | TERMINAL INFORMATION (IP ADDRESS) |
|---|---|
| R | A |
| S | B |
| R | C |
| T | D |
| S | E |
|  |  |

~406A

FIG.11
TRANSMISSION/RECEPTION DATA ITEM

| | ITEM | ITEM DETAILS | NOTES | ITEM NAME | DATA |
|---|---|---|---|---|---|
| (a) | MOTION PICTURE INFORMATION | INFORMATION TO SPECIFY PROGRAM | BROADCAST STATION CODE, G CODE, ETC. | id | 6ch |
| (b) | | HAND-DRAWING CLEAR INFORMATION | true: CLEAR<br>false: HAND-DRAWING | clear | true/false |
| (c) | HAND-DRAWING DATA | [WHEN SEQUENTIALLY DISPLAYING] APEX COORDINATES $(Cx^*, Cy^*)$ OF LINE WITH LEFT END OF DISTRIBUTING IMAGE AS (0,0) | $(Cx1,Cy1,Ct1)$ $(Cx2,Cy2,Ct2)$<br>$Ct1 = 0$ $(Cx4,Cy4,Ct4)$<br>$(Cx3,Cy3,Ct3)$ $(Cx5,Cy5,Ct5)$ | line | Cx1,Cy1:Cx2,Cy2:Cx3,Cy3:Cx4,Cy4:Cx5,Cy5 |
| | | [WHEN DISPLAYING AT DRAWING SPEED OF TRANSMISSION SIDE] APEX COORDINATES $(Cx^*, Cy^*)$ OF LINE WITH LEFT END OF DISTRIBUTING IMAGE AS (0,0) AND TIME (ms) FROM t1 | | | Cx1,Cy1,Ct1:Cx2,Cy2,Ct2:Cx3,Cy3,Ct3:Cx4,Cy4,Ct4:Cx5,Cy5,Ct5 |
| (d) | | LINE COLOR | (r, g, b) | color | 255,0,0 |
| (e) | | LINE WIDTH (px) | ▬▬ } 10(px) | width | 10 |
| (f) | PAUSE, RESUME INFORMATION | TIME (ms) FROM STARTING PROGRAM | TIME, SCENE INFORMATION, FRAME NUMBER | time | 30000 |

FIG.21
TRANSMISSION/RECEPTION DATA ITEM

| | ITEM | ITEM DETAILS | NOTES | ITEM NAME | DATA |
|---|---|---|---|---|---|
| (a) | MOTION PICTURE INFORMATION | INFORMATION FOR SPECIFYING CONTENTS | URL OF CONTENTS | id | http://***/*.asf |
| (b) | HAND-DRAWING DATA | HAND-DRAWING CLEAR INFORMATION | true: CLEAR<br>false: HAND-DRAWING | clear | true/false |
| | | [WHEN SEQUENTIALLY DISPLAYING] APEX COORDINATES (Cx*,Cy*) OF LINE WITH LEFT END OF DISTRIBUTING IMAGE AS (0,0) | (Cx1,Cy1,Ct1) (Cx2,Cy2,Ct2)<br>Ct1 = 0<br>(Cx4,Cy4,Ct4)<br>(Cx3,Cy3,Ct3)<br>(Cx5,Cy5,Ct5) | | Cx1,Cy1:Cx2,Cy2:Cx3,Cy3:Cx4,Cy4:Cx5,Cy5 |
| (c) | | [WHEN DISPLAYING AT DRAWING SPEED OF TRANSMISSION SIDE] APEX COORDINATES (Cx*,Cy*) OF LINE WITH LEFT END OF DISTRIBUTING IMAGE AS (0,0) AND TIME (ms) FROM t1 | | line | Cx1,Cy1,Ct1:Cx2,Cy2,Ct2:Cx3,Cy3,Ct3:Cx4,Cy4,Ct4:Cx5,Cy5,Ct5 |
| (d) | | LINE COLOR | (r, g, b) | color | 255,0,0 |
| (e) | | LINE WIDTH (px) | ▬ } 10(px) | width | 10 |
| (f) | TERMINAL INFORMATION | MEMBER INFORMATION | CHAT ROOM NAME OR THE LIKE ASSIGNED BY CHAT SERVER | roomId | FYVujbghPIHOn8io |
| (g) | | DESTINATION INFORMATION | IP ADDRESS AND THE LIKE OF DISTRIBUTION REQUIRED TERMINAL | return | 192.168.1.1 |

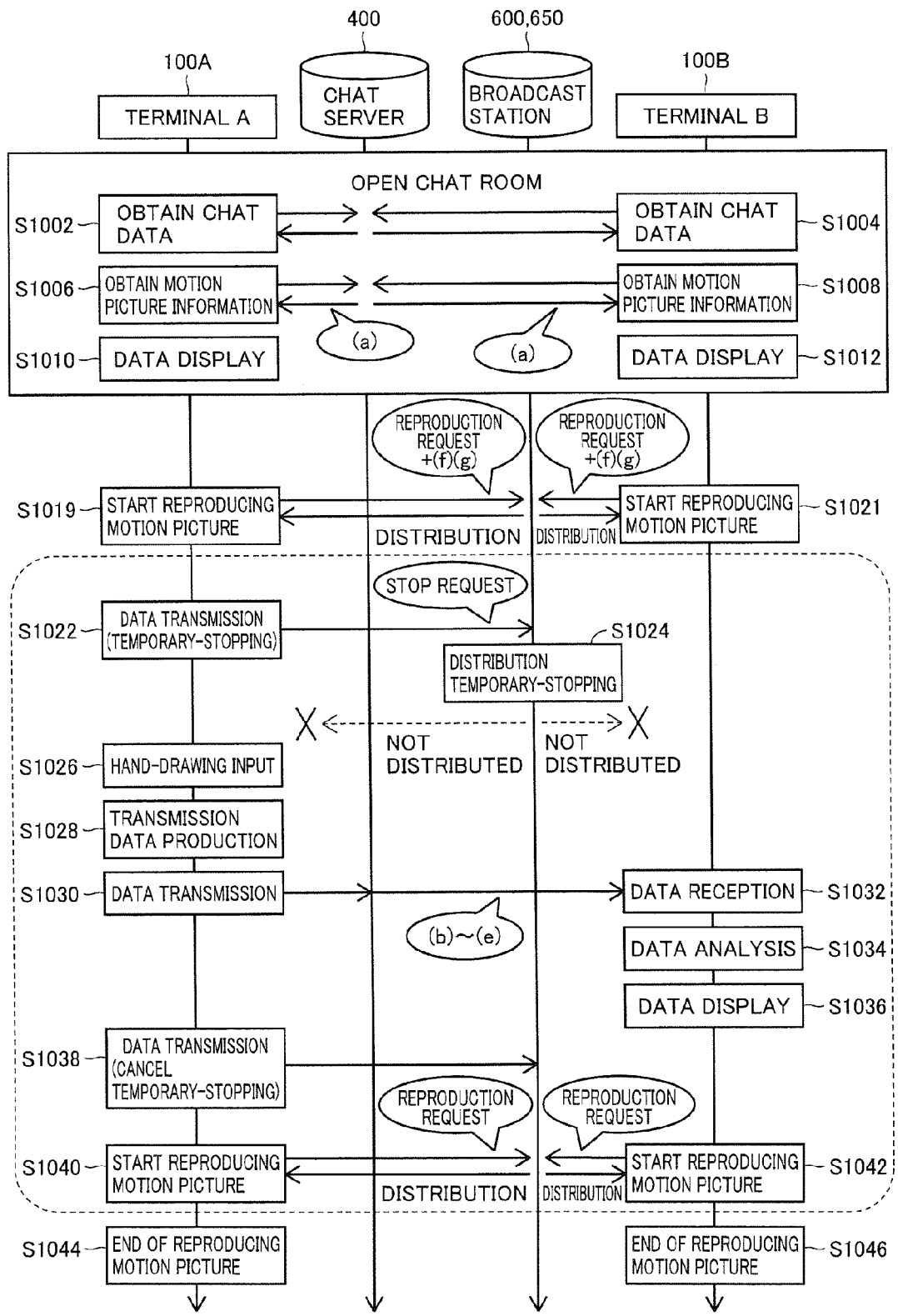

NETWORK SYSTEM, COMMUNICATION METHOD, AND COMMUNICATION TERMINAL

TECHNICAL FIELD

The present invention relates to a network system including at least first and second communication terminals capable of communication with each other via a network, a communication method, and a communication terminal. Particularly, the present invention relates to a network system in which first and second communication terminals receive and reproduce the same contents, a communication method, and a communication terminal.

BACKGROUND ART

There is known a network system in which a plurality of communication terminals capable of connecting on the Internet exchange hand-drawing data. For example, a server/client system, a P2P (Peer to Peer) system and the like can be cited. In such a network system, each communication terminal transmits and/or receives hand-drawing data, text data, and the like. Each communication terminal provides a display of a hand-drawing image and/or text on the display based on the received data.

There is also known a communication terminal that receives contents including a motion picture from a broadcast station or a contents server to reproduce the relevant contents.

For example, Japanese Patent Laying-Open No. 2006-4190 (PTL 1) discloses a chat service system for mobile phones. According to Japanese Patent Laying-Open No. 2006-4190 (PTL 1), the system includes a distribution server causing a plurality of mobile phone terminals and a Web terminal for an operator, connected for communication on the Internet, to form a motion picture display region and text display region on the browser display screen of the terminal, and distribute the motion picture data that is streaming-displayed at the motion picture display region, and a chat server supporting a chat between the mobile phone terminals and the operator Web terminal and causing chat data that is constituted of text data to be displayed at the text display region. The chat server allows each operator Web terminal to establish, relative to the plurality of mobile phone terminals, a chat channel independently for each mobile phone terminal.

CITATION LIST

Patent Literature

PTL 1: Japanese Patent Laying-Open No. 2006-4190

SUMMARY OF INVENTION

Technical Problem

In the case where a plurality of users exchange information while viewing the contents, there is a possibility that information related to a desired scene cannot be exchanged appropriately due to the procession of the contents. For example, in the case where the user of the first communication terminal transfers her/his comments on the first scene to the user of second communication terminal, there is a possibility of the first scene being switched to the second scene during the input of comments through hand-drawing or through conversation by the user of the first communication terminal. Furthermore, in the case where the first communication terminal and the second communication terminal are displaying different scenes, it will become difficult for the users of the first and second communication terminals to carry on a chat about the same scene.

In view of the foregoing, an object of the present invention is to provide a network system in which users of first and second communication terminals can exchange information while viewing the same scene, a communication method, and a communication terminal.

Solution to Problem

According to an aspect of the present invention, there is provided a network system including first and second communication terminals. The first communication terminal is capable of obtaining externally-applied contents. The first communication terminal includes a first display, a first communication device for communicating with the second communication terminal, and a first processor for reproducing contents using the first display, temporarily stopping the reproduction of the contents and sending a stop instruction to the second communication terminal according to a first input, and resuming the reproduction of the contents and transmitting a resumption instruction to the second communication terminal according to a second input. The second communication terminal is capable of obtaining externally-applied contents at the same timing as the first communication terminal. The second communication terminal includes a second display, a second communication device for communicating with the first communication terminal, and a second processor for reproducing the contents using the second display, temporarily stopping the reproduction of the contents according to the stop instruction from the first communication terminal, and resuming the reproduction of the contents according to a resumption instruction from the first communication terminal.

Preferably, the first display is a touch panel. During temporary-stopping of the contents, the first processor accepts input of a hand-drawing image using the touch panel, displays the hand-drawing image on the contents using a first touch panel, and transmits the hand-drawing image to the second communication terminal via the first communication device. During temporary-stopping of the contents, the second processor receives the hand-drawing image from the first communication terminal via the second communication device, and displays the hand-drawing image on the contents using the second display.

Preferably, the first processor senses that an external object has touched the touch panel to accept the touching operation as a first input, and senses lift-off of the external object from the touch panel to accept the lift-off operation as a second input.

Preferably, the first communication terminal further includes a first memory. The first processor stores the obtained contents in the first memory and resumes the reproduction of the contents from the temporary-stopped position according to the second input. The second communication terminal further includes a second memory. The second processor stores the obtained contents in the second memory and resumes the reproduction of the contents from the temporary-stopped position according to the resumption instruction.

Preferably, the stop instruction includes information indicating the temporary-stopped position of the contents.

Preferably, the stop instruction includes information indicating a temporary-stopped time. The resumption instruction includes information indicating a temporary-stopped period.

According to another aspect of the present invention, there is provided a communication method at a network system including first and second communication terminals. The communication method includes the steps of: receiving, by the first communication terminal, externally-applied contents to reproduce the contents at the first display; receiving, by the second communication terminal, externally-applied contents at the same timing as the first communication terminal to reproduce the contents at the second display; temporarily stopping, by the first communication terminal, the reproduction of the contents and transmitting a stop instruction to the second communication terminal according to the first input; temporarily stopping, by the second communication terminal, the reproduction of the contents according to the stop instruction from the first communication terminal; resuming, by the first communication terminal, the reproduction of the contents and transmitting the resumption instruction to the second communication terminal according to the second input; and resuming, by the second communication terminal, the reproduction of the contents according to the resumption instruction from the first communication terminal.

According to a further aspect of the present invention, there is provided a communication terminal capable of obtaining externally-applied contents. The communication terminal includes a display, a communication device for communicating with an other communication terminal, and a processor for reproducing contents using the display, temporarily stopping reproduction of the contents and transmitting a stop instruction to the other communication terminal according to a first input, resuming the reproduction of the contents and transmitting a resumption instruction to the other communication terminal according to a second input, temporarily stopping the reproduction of the contents according to a stop instruction from the other communication terminal, and resuming the reproduction of the contents according to a resumption instruction from the other communication terminal.

Preferably, the display is a touch panel. During temporary-stopping of the contents, the processor accepts input of a first hand-drawing image using the touch panel, displays the first hand-drawing image on the contents using the touch panel, transmits the first hand-drawing image to the other communication terminal via the communication device, receives a second hand-drawing image from the other communication terminal via the communication device, and displays the second hand-drawing image on the contents using the touch panel.

Preferably, the processor senses that an external object has touched the touch panel to accept the touching operation as a first input, and senses lift-off of the external object from the touch panel to accept the lift-off operation as a second input.

Preferably, the communication terminal further includes a memory. The processor stores the received contents in the memory, and resumes the reproduction of the contents from a temporary-stopped position according to a second input or a resumption instruction.

Preferably, the stop instruction includes information indicating a temporary-stopped position of the contents.

Preferably, the stop instruction includes information indicating a temporary-stopped time. The resumption instruction includes information indicating a temporary-stopped period.

According to another aspect of the present invention, there is provided a communication method at a communication terminal including a display, a processor, and a communication device. The communication method includes the steps of: receiving, by the processor, externally-applied contents to reproduce the contents using the display; temporarily stopping, by the processor, reproduction of the contents and transmitting a stop instruction to an other communication terminal via the communication device according to the first input; resuming, by the processor, the reproduction of the contents and transmitting a resumption instruction to the other communication terminal via a communication device according to a second input; temporarily stopping, by the processor, the reproduction of the contents according to a stop instruction from the other communication terminal; and resuming, by the processor, the reproduction of the contents according to a resumption instruction from the other communication terminal.

Advantageous Effects of Invention

By a network system, communication method, and communication terminal of the present invention set forth above, the users of first and second communication terminals can exchange information while viewing the same scene.

BRIEF DESCRIPTION OF DRAWINGS

FIG. 11 is a pictorial representation of a data structure of transmission data according to the first embodiment.

FIG. 21 is a pictorial representation of a data structure of transmission data according to the second embodiment.

FIG. 22 is a flowchart of a modification of the procedure of P2P communication processing at the mobile phone according to the second embodiment.

DESCRIPTION OF EMBODIMENTS

Figure 1:
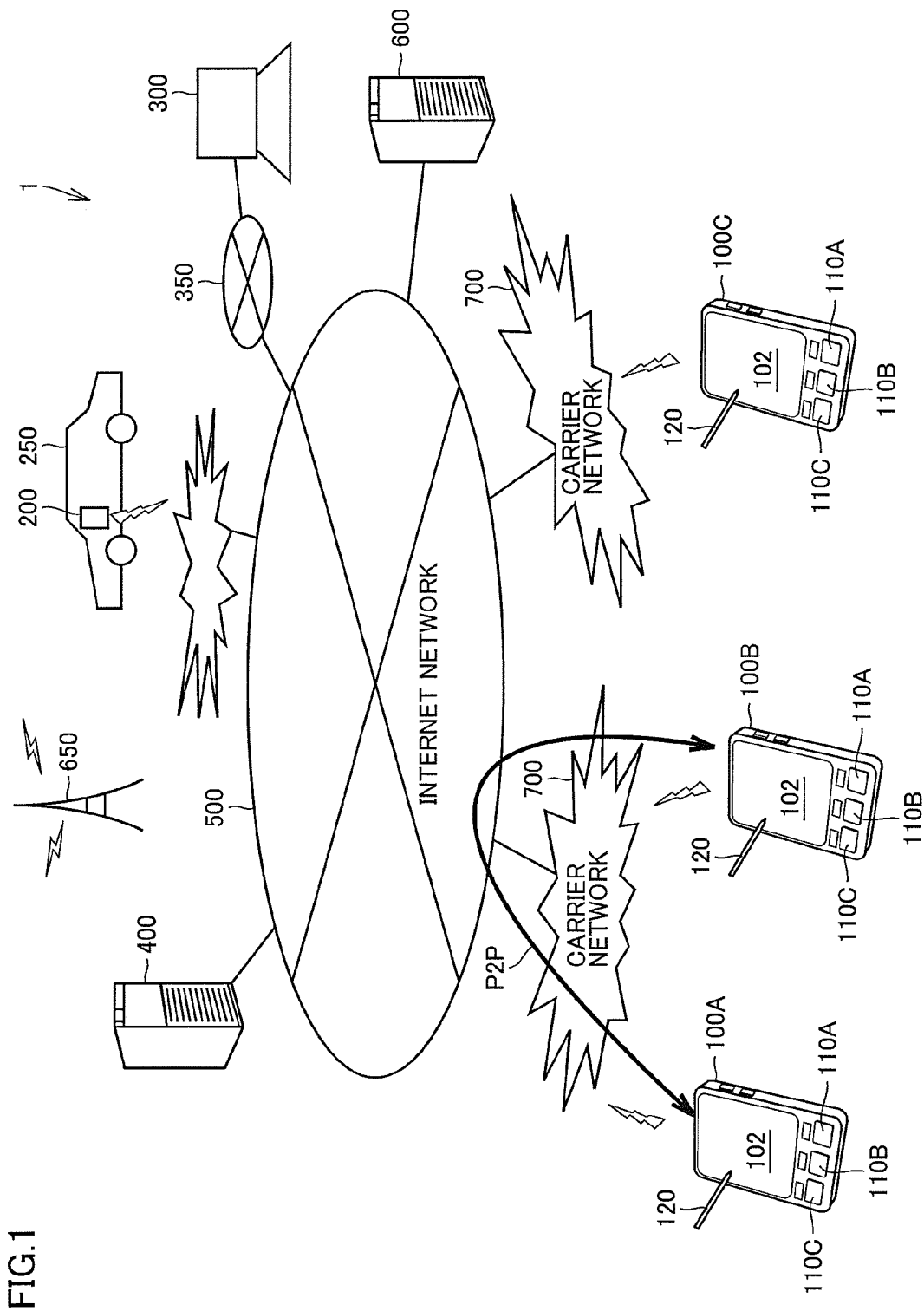
FIG. 1 schematically represents an example of a network system according to an embodiment.

Embodiments of the present invention will be described hereinafter with reference to the drawings. In the description, the same elements have the same reference characters allotted, and their designation and function are also identical. Therefore, detailed description thereof will not be repeated.

The following description is based on a mobile phone as a typical example of a "communication terminal". The communication terminal may be any other information communication device that can be connected on a network such as a personal computer, a car navigation system (satellite navigation system), a PND (Personal Navigation Device), a PDA (Personal Data Assistance), a game machine, an electronic dictionary, an electronic book, or the like.

First Embodiment

Overall Configuration of Network System 1

First, an entire configuration of a network system 1 according to the present embodiment will be described. FIG. 1 schematically shows an example of network system 1 according to the present embodiment. As shown in FIG. 1, network system 1 includes mobile phones 100A, 100B, and 100C, a chat server (first server device) 400, a contents server (second server device) 600, a broadcast station (antenna of TV broadcast) 650, an INTERNET (first network) 500, and a carrier network (second network) 700. Network system 1 of the present embodiment includes a car navigation device 200 mounted on a vehicle 250, and a personal computer (PC) 300.

For the sake of simplification, network system 1 of the present embodiment will be described based on the case where first mobile phone 100A, second mobile phone 100B, and third mobile phone 100C are incorporated. Mobile phones 100A, 100B, and 100C may be generically referred to as mobile phone 100 when a configuration or function common to each of mobile phones 100A, 100B, and 100C is described. Furthermore, mobile phones 100A, 100B, and 100C, car navigation device 200, and personal computer 300 may also be generically referred to as a communication terminal when a configuration or function common to each thereof is to be described.

Mobile phone 100 is configured to allow connection to carrier network 700. Car navigation device 200 is configured to allow connection to Internet 500. Personal computer 300 is configured to allow connection to Internet 500 via a local area network (LAN) 350 or a wide area network (WAN). Chat server 400 is configured to allow connection to Internet 500. Contents server 600 is configured to allow connection to Internet 500.

Figure 2:
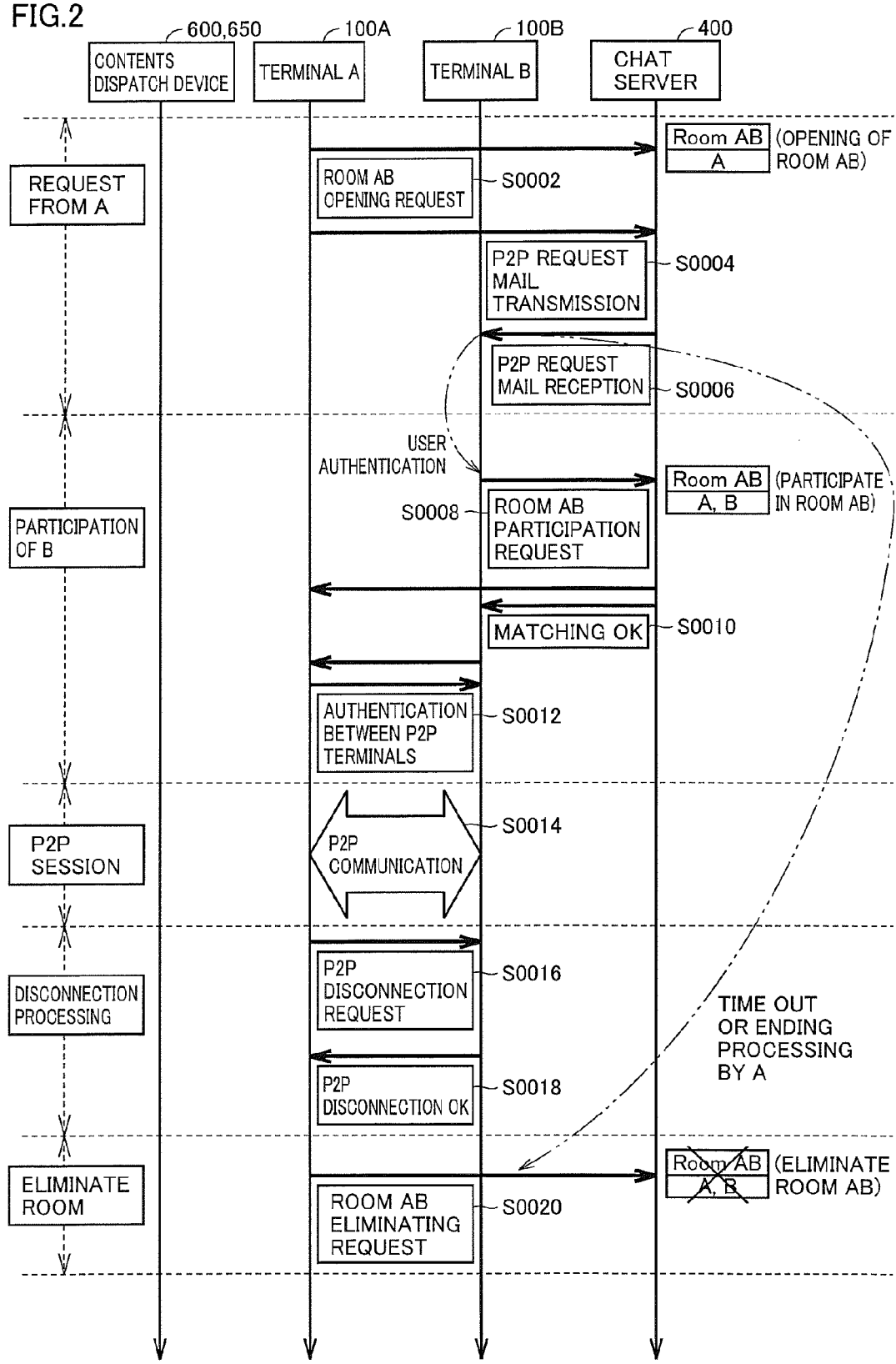
FIG. 2 is a sequence diagram representing an operation overview in the network system of the embodiment.

In more detail, first mobile phone 100A, second mobile phone 100B, third mobile phone 100C, car navigation device 200 and personal computer 300 can be connected with each other and transmit/receive data mutually via Internet 500 and/or carrier network 700 and/or a mail transmission server (chat server 400 in FIG. 2).

In the present embodiment, mobile phone 100, car navigation device 200, and personal computer 300 have identification information for identifying itself (for example, mail address, Internet protocol (IP) address, or the like) assigned. Mobile phone 100, car navigation device 200, and personal computer 300 can store the identification information of another communication terminal in its internal recording medium, and can carry out data transmission/reception with that other communication terminal via carrier network 700 or Internet 500 based on the identification information.

Mobile phone 100, car navigation device 200, and personal computer 300 of the present embodiment can use the IP address assigned to another terminal for data transmission/reception with the relevant other communication terminal without the intervention of servers 400 and 600. In other words, mobile phone 100, car navigation device 200, and personal computer 300 in network system 1 of the present embodiment can establish the so-called P2P (Peer to Peer) type network.

When each communication terminal is to gain access to chat server 400, i.e. each communication terminal gains access on the Internet, it is assumed that an IP address is assigned by chat server 400 or a server device not shown. Since the details of this IP address assigning process is well known, description thereof will not be repeated.

Broadcast station 650 according to the present embodiment transmits digital terrestrial broadcasting. For example, broadcast station 650 transmits and receives one segment (One Seg) broadcast. Mobile phone 100, car navigation device 200, and personal computer 300 receive One Seg broadcast. The users of mobile phone 100, car navigation device 200, and personal computer 300 can watch a television program (contents) from broadcast station 650.

Mobile phone 100, car navigation device 200 and personal computer 300 receive the Internet TV or other motion picture contents substantially at the same time from contents server 600 via Internet 500. The users of mobile phone 100, car navigation device 200, and personal computer 300 can view the motion picture contents from contents server 600.

<Overall Operation Overview of Network System 1>

The operation overview of network system 1 according to the present embodiment will be described hereinafter. FIG. 2 represents the sequence of the operation overview in network system 1 of the present embodiment. In FIG. 2, contents server 600 and broadcast station 650 are generically referred to as contents dispatch device hereinafter.

As shown in FIGS. 1 and 2, each communication terminal of the present embodiment must first exchange (obtain) the IP address of the other party for performing P2P type data transmission/reception. Upon obtaining the IP address of the other party, each communication terminal sends a message, an attach file, or the like to another communication terminal through the P2P type data transmission/reception.

The following description is based on the case where each communication terminal transmits/receives a message and/or attach file via a chat room generated by chat server 400. Further, the case where first mobile phone 100A generates a new chat room, and invites a second mobile phone 100B to that chat room will be described.

First, first mobile phone 100A (terminal A in FIG. 2) requests chat server 400 of an IP registration (log in) (step S0002). First mobile phone 100A may obtain an IP address at the same time, or obtain an IP address in advance. Specifically, first mobile phone 100A transmits to chat server 400 the mail address and IP address of first mobile phone 100A, the mail address of second mobile phone 100B, and a message requesting generation of a new chat room via carrier network 700, a mail transmission server (chat server 400) and Internet 500.

Chat server 400 responds to the request to store the mail address of first mobile phone 100A in association with its IP address. Chat server 400 produces a room name, and generates a chat room of the relevant room name, based on the mail address of first mobile phone 100A and the mail address of second mobile phone 100B. At this stage, chat server 400 may notify first mobile phone 100A that generation of a chat room is completed. Chat server 400 stores the room name and the IP address of the participating communication terminal in association.

Alternatively, first mobile phone 100A produces a room name of a new chat room, and transmits that room name to chat server 400, based on the mail address of first mobile phone 100A and the mail address of second mobile phone 100B. Chat server 400 generates a new chat room based on the room name.

First mobile phone 100A transmits to second mobile phone 100B a mail message informing that a new chat room has been generated, i.e. requesting P2P participation indicating an invitation to that chat room (step S0004, step S0006). Specifically, first mobile phone 100A transmits P2P participation request mail to second mobile phone 100B via carrier network 700, mail transmission server (chat server 400) and Internet 500 (step S0004, step S0006). Chat server 400 may be configured to play the role of contents server 600.

Upon receiving the P2P participation request mail (step S0006), second mobile phone 100B produces a room name based on the mail address of first mobile phone 100A and the mail address of second mobile phone 100B, and transmits to chat server 400 the mail address and IP address of second mobile phone 100B as well as a message indicating participation in the chat room of that room name (step S0008). Second mobile phone 100B may obtain the IP address at the same time, or first obtain an IP address, and then gain access to chat server 400.

Chat server 400 accepts that message and determines whether the mail address of second mobile phone 100B corresponds to the room name, and then stores the mail address of second mobile phone 100B in association with the IP address. Then, chat server 400 transmits to first mobile phone 100A a message informing that second mobile phone 100B is participating in the chat room and the IP address of second mobile phone 100B (step S0010). At the same time, chat server 400 transmits to second mobile phone 100B a message informing acceptance of the participation in the chat room and the IP address of first mobile phone 100A.

First mobile phone 100A and second mobile phone 100B obtain the mail address and IP address of the other party to authenticate each other (step S0012). Upon completing authentication, first mobile phone 100A and second mobile phone 100B initiate P2P communication (chat communication) (step S0014). The operation overview during P2P communication will be described afterwards.

In response to first mobile phone 100A transmitting a message informing disconnection of P2P communication to second mobile phone 100B (step S0016), second mobile phone 100B transmits a message informing that the disconnection request has been accepted to first mobile phone 100A (step S0018). First mobile phone 100A transmits a request for eliminating the chat room to chat server 400 (step S0020). Chat server 400 eliminates the chat room.

Figure 3:
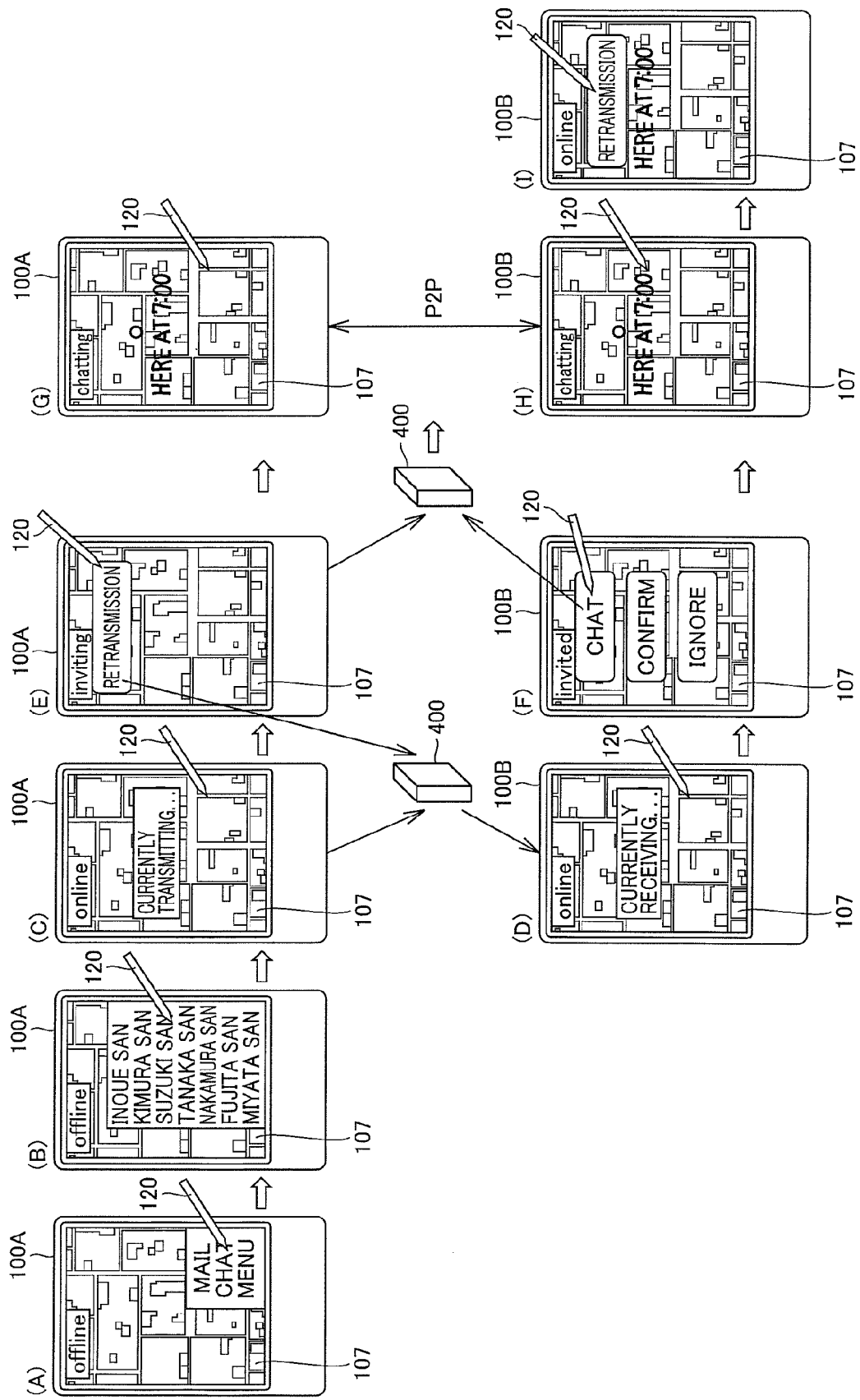
FIG. 3 is a pictorial representation of the transition of the display at a communication terminal in line with the operation overview of the present embodiment.

The operation overview of network system 1 according to the present embodiment will be described hereinafter in further detail with reference to FIGS. 2 and 3. FIG. 3 is a pictorial representation of the transition in the display at a communication terminal in line with the operation overview according to the present embodiment. The following description is based on the case where first mobile phone 100A and second mobile phone 100B transmit/receive a hand-drawing image while displaying the contents obtained from broadcast station 650 or contents server 600 as the background.

As shown in FIG. 3 (A), initially first mobile phone 100A receives and displays contents such as a TV program. In the case where the user of first mobile phone 100A wishes to have a chat with the user of second mobile phone 100B while viewing the TV program, first mobile phone 100A accepts a chat starting instruction. As shown in FIG. 3 (B), first mobile phone 100A accepts an instruction to select the other party user.

As shown in FIG. 3 (C), first mobile phone 100A transmits to second mobile phone 100B the information to identify the TV program via the mail transmission server (chat server 400) (step S0004). As shown in FIG. 3 (D), second mobile phone 100B receives information from first mobile phone 100A (step S0006). Second mobile phone 100B receives and displays the TV program based on the relevant information.

First mobile phone 100A and second mobile phone 100B may both receive motion picture contents such as a TV program from broadcast station 650 or contents server 600 upon starting P2P communication, i.e. during P2P communication.

As shown in FIG. 3 (E), first mobile phone 100A can also repeat mail transmission without P2P communication with second mobile phone 100B. Upon completion of mail transmission, first mobile phone 100A registers its own IP address at chat server 400, and requests generation of a new chat room based on the mail address of first mobile phone 100A and the mail address of second mobile phone 100B (step S0002).

As shown in FIG. 3 (F), second mobile phone 100B accepts an instruction to initiate a chat, and transmits to chat server 400 the room name, a message informing participation in the chat room, and its own IP address (step 0008). First mobile phone 100A obtains the IP address of second mobile phone 100B, and second mobile phone 100B obtains the IP address of first mobile phone 100A (step S0010) to authenticate each other (step S0012).

Thus, as shown in FIGS. 3 (G) and (H), first mobile phone 100A and second mobile phone 100B can carry out P2P communication (step S0014). In other words, first mobile phone 100A and second mobile phone 100B according to the present embodiment can transmit/receive data during reproduction of motion picture contents.

More specifically, in the present embodiment, first mobile phone 100A accepts input of a hand-drawing image from a user, and displays the hand-drawing image over the contents. First mobile phone 100A transmits the hand-drawing image to second mobile phone 100B. Second mobile phone 100B displays the hand-drawing image on the motion picture contents based on the hand-drawing data from first mobile phone 100A.

In an opposite manner, second mobile phone 100B accepts input of a hand-drawing image from a user and displays that hand-drawing image over the motion picture contents. Second mobile phone 100B transmits the hand-drawing image to first mobile phone 100A. Second mobile phone 100B displays the hand-drawing data over the motion picture contents based on the hand-drawing data from first mobile phone 100A.

When an input end button is selected or input of hand-drawing data is started, i.e. when the first input is accepted, at either first mobile phone 100A or second mobile phone 100B in network system 1 of the present embodiment, both the first mobile phone 100A and second mobile phone 100B temporarily stop reproducing the motion picture contents, as will be described afterwards. Subsequently, when the input end button is selected or input of hand-drawing data ends at either first mobile phone 100A or second mobile phone 100B, i.e. when the second input is accepted, both of first mobile phone 100A and second mobile phone 100B resume the reproduction of the motion picture contents.

After first mobile phone 100A disconnects P2P communication (step S0016, step S0018), second mobile phone 100B can carry out mail transmission with first mobile phone 100A and the like, as shown in FIG. 3 (I). It is to be noted that P2P communication can be conducted in a TCP/IP communication scheme and mail transmission/reception can be conducted in an HTTP communication scheme. In other words, mail transmission/reception is allowed also during P2P communication.

<Operation Overview Related to Hand-Drawing Data Transmission/Reception at Network System 1>

Figure 4:
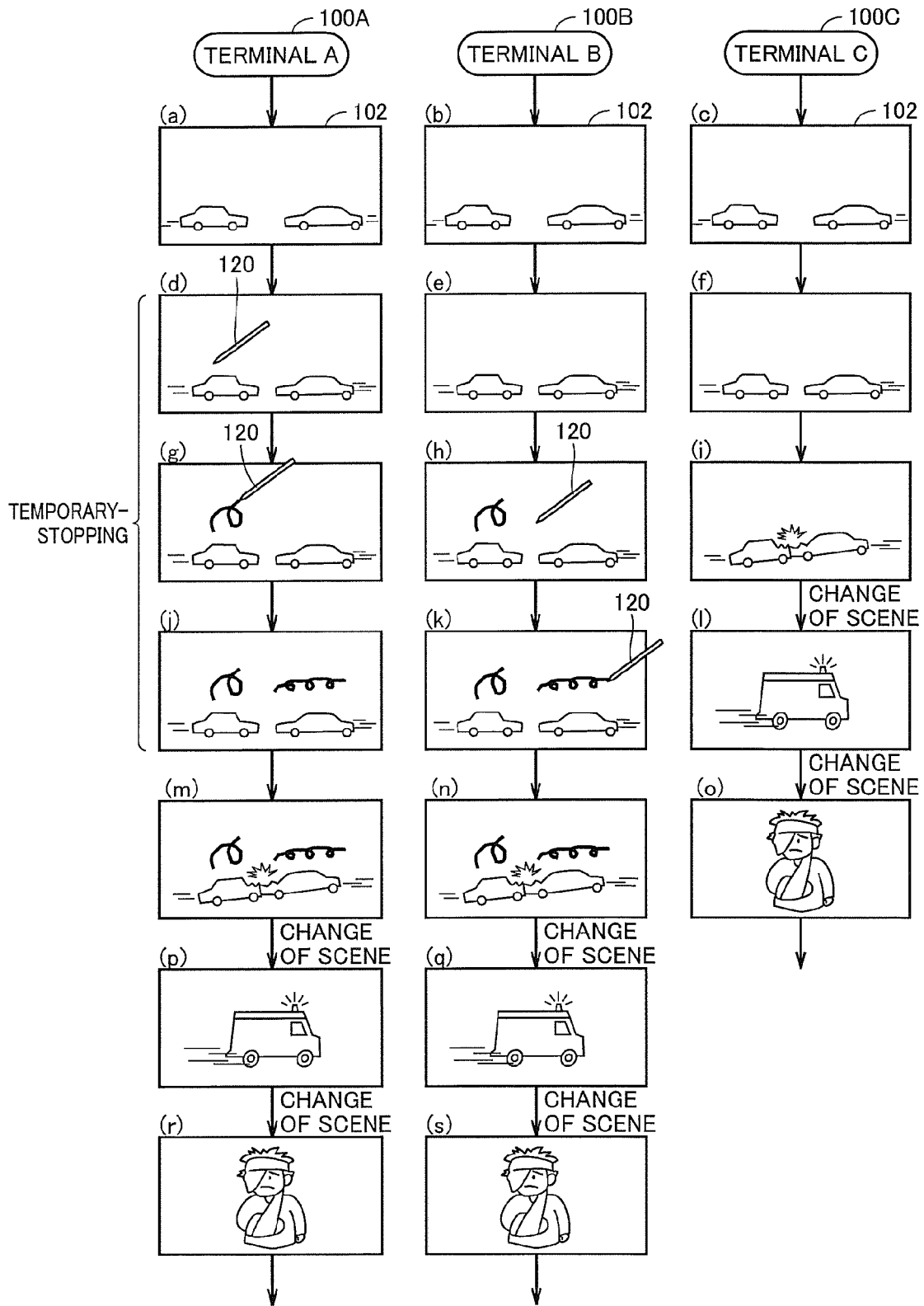
FIG. 4 is a pictorial representation of the operation overview related to transmission and reception of hand-drawing data according to a first embodiment.

The operation overview related to transmission/reception of hand-drawing data according to the present embodiment will be described in further detail hereinafter. FIG. 4 is a pictorial representation of the operation overview related to transmission/reception of hand-drawing data according to the present embodiment.

The following description is based on the case where first mobile phone 100A and second mobile phone 100B carry out chat communication (transmission/reception of hand-drawing image) directly without the intervention of the server. However, first mobile phone 100A and second mobile phone 100B may carry out a chat communication (transmission/reception of hand-drawing image) via the server.

Referring to FIGS. 4(a) and (b), first mobile phone 100A and second mobile phone 100B receive the same motion picture contents (for example, a TV program) from broadcast station 650 or contents server 600, and display the relevant motion picture contents. As used herein, the motion picture contents can be stored (recorded) by first mobile phone 100A and second mobile phone 100B. At this stage, a third mobile phone 100C not participating in the chat communication may be receiving and displaying the same motion picture contents.

Referring to FIG. 4(d)-(f), the motion picture contents proceed over time. In other words, the displayed image continuously changes at first mobile phone 100A, second mobile phone 100B, and third mobile phone 100C. In association, first mobile phone 100A, second mobile phone 100B, and third mobile phone 100C may output the sound corresponding to the motion picture contents.

Referring to FIG. 4(d), when the user of first mobile phone 100A initiates input of a hand-drawing image, first mobile phone 100A causes the procession of the motion picture contents to pause. In other words, first mobile phone 100A temporarily stops the motion picture contents to display a stationary picture. Then, first mobile phone 100A sends the pause information to second mobile phone 100B via P2P communication.

Specifically, when the user touches touch panel 102 using stylus pen 120 or her/his finger, a determination is made that first mobile phone 100A has accepted the first input. Alternatively, a determination is made that first mobile phone 100A has accepted the first input when the user depresses a hand-drawing start button.

Referring to FIG. 4(e), second mobile phone 100B receives the pause information and causes the procession of the motion picture contents to pause. In other words, second mobile phone 100B temporarily stops the motion picture contents to display a stationary image.

Referring to FIG. 4(f), third mobile phone 100C does not receive the pause information at this stage since it is not participating in the chat communication. Third mobile phone 100C continues to reproduce the motion picture contents in a usual manner.

Referring to FIG. 4(g), when the user enters a hand-drawing image at first mobile phone 100A, first mobile phone 100A displays the hand-drawing image on touch panel 102. First mobile phone 100A transmits the hand-drawing data to second mobile phone 100B via P2P communication.

Referring to FIG. 4(h), second mobile phone 100B receives the hand-drawing data from first mobile phone 100A to display the hand-drawing image.

Referring to FIG. 4(i), third mobile phone 100C does not receive the pause information or the hand-drawing image at this stage since it is not participating in the chat communication. Third mobile phone 100C continues to reproduce the motion picture contents in a usual manner.

Referring to FIG. 4(k), when the user enters a hand-drawing image at second mobile phone 100B, second mobile phone 100B displays the hand-drawing image on touch panel 102. Second mobile phone 100B transmits the hand-drawing data to first mobile phone 100A via P2P communication.

Referring to FIG. 4(j), first mobile phone 100A receives the hand-drawing data from second mobile phone 100B and displays the hand-drawing image.

Referring to FIG. 4(l), third mobile phone 100C does not receive the pause information or the hand-drawing image at this stage since it is not participating in the chat communication. Third mobile phone 100C continues to reproduce the motion picture contents in a usual manner.

Referring to FIG. 4(m), when the users of first mobile phone 100A and second mobile phone 100B end the entry of hand-drawing images, first mobile phone 100A resumes the reproduction of the motion picture contents. Then, first mobile phone 100A transmits resume information to second mobile phone 100B.

More specifically, when stylus pen 120 or a finger is not in contact with touch panel 102 of first mobile phone 100A and hand-drawing data from second mobile phone 100B is no longer received, a determination is made that first mobile phone 100A has accepted the second input. Alternatively, a determination is made that first mobile phone 100A has accepted the second input when the user depresses the hand-drawing end button.

Referring to FIG. 4(n), second mobile phone 100B receives the resume information from first mobile phone 100A and resumes the reproduction of the motion picture contents. Referring to FIG. 4(o), third mobile phone 100C continues to reproduce the motion picture contents in a usual manner.

First mobile phone 100A and second mobile phone 100B determine whether the scene in the motion picture contents currently reproduced has been switched or not during reproduction thereof. Referring to FIGS. 4(p) and (q), first mobile phone 100A and second mobile phone 100B delete the hand-drawing image drawn up to that time when a determination is made that the scene of the motion picture contents has changed. This is because the possibility of the hand-drawing image drawn up to that time being related to the scene prior to switching is high.

Likewise in FIGS. 4(r) and (s), first mobile phone 100A and second mobile phone 100B delete the hand-drawing image drawn up to that time when a determination is made that the scene of the motion picture contents has changed. This is because the possibility of the hand-drawing image drawn up to that time being related to the scene prior to switching is high.

In FIG. 4, first mobile phone 100A that has accepted the first input accepts the second input. First mobile phone 100A and second mobile phone 100B are both configured to allow input of a hand-drawing image during the pause of motion picture contents.

In this context, network system 1 of the present embodiment is also applicable to the configuration set forth below.

(1) Only first mobile phone 100A that has accepted the first input (that has transmitted the pause information) may allow acceptance of the second input.

(2) Only second mobile phone 100B that has not accepted the first input (that has received the pause information) may allow acceptance of the second input.

(3) Both first mobile phone 100A and second mobile phone 100B may allow acceptance of the second input, regardless of whether the first input has been accepted or not (regardless of whether transmitting/receiving pause information).

Input of a hand-drawing image will be described hereinafter.

(1) Only first mobile phone 100A that has accepted the first input (that has transmitted the pause information) may allow acceptance (allow transmission) of the hand-drawing image input.

(2) Both first mobile phone 100A and second mobile phone 100B may allow acceptance (allow transmission) of the hand-drawing image input, regardless of whether the first input has been accepted or not (regardless of whether transmitting/receiving pause information).

In addition to the exemplary application set forth above, first mobile phone 100A and second mobile phone 100B may determine that initiating input of a hand-drawing image, i.e. the contact of stylus pen 120 with touch panel 102, is the first input. Alternatively, first mobile phone 100A and second mobile phone 100B may take the depression of the hand-drawing input start button on touch panel 102 as the input of a first instruction.

Then, first mobile phone 100A and second mobile phone 100B may determine that ending input of a hand-drawing image, i.e. the lift-off of stylus pen 120 from touch panel 102, is the second input. Alternatively, first mobile phone 100A and second mobile phone 100B may take the depression of the hand-drawing input end button on touch panel 102 as the input of a second instruction.

Thus, when any communication terminal accepts a start instruction of a hand-drawing image input at network system 1 of the present embodiment, all communication terminals currently in the chat communication temporarily stop reproduction of the motion picture contents. Then, when any of the communication terminals accepts an end instruction of a hand-drawing image input, all the communication terminals currently in the chat communication resume the reproduction of the motion picture contents.

Thus, all the users currently in the chat communication can transmit and receive a hand-drawing image while viewing the same scene. In other words, the possibility of undesirable scene switching during input of a hand-drawing image and/or first mobile phone 100A and second mobile phone 100B displaying different scenes during input of a hand-drawing image can be reduced at network system 1 of the present embodiment.

A configuration of network system 1 to realize such function will be described in detail hereinafter.

<Hardware Configuration of Mobile Phone 100>

Figure 5:
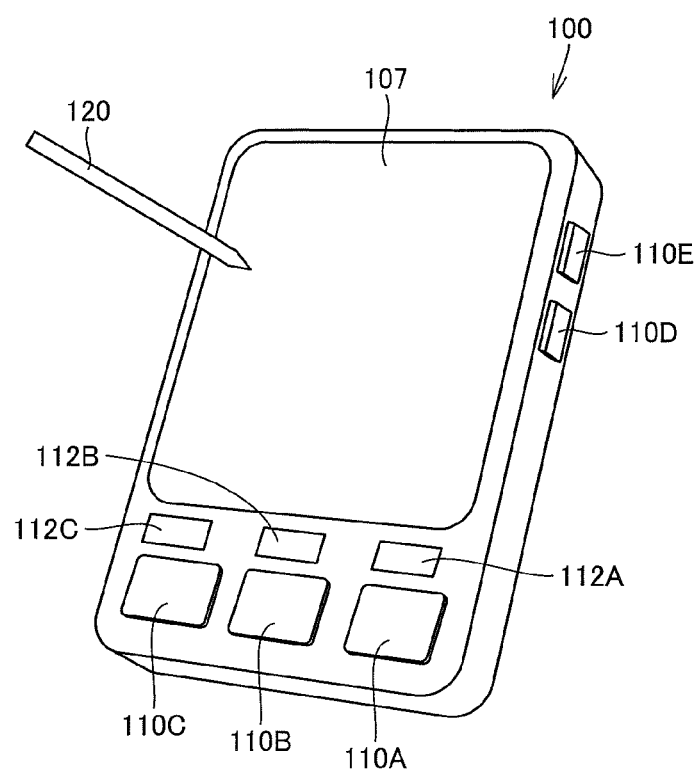
FIG. 5 is a pictorial representation of an appearance of a mobile phone according to the present embodiment.
Figure 6:
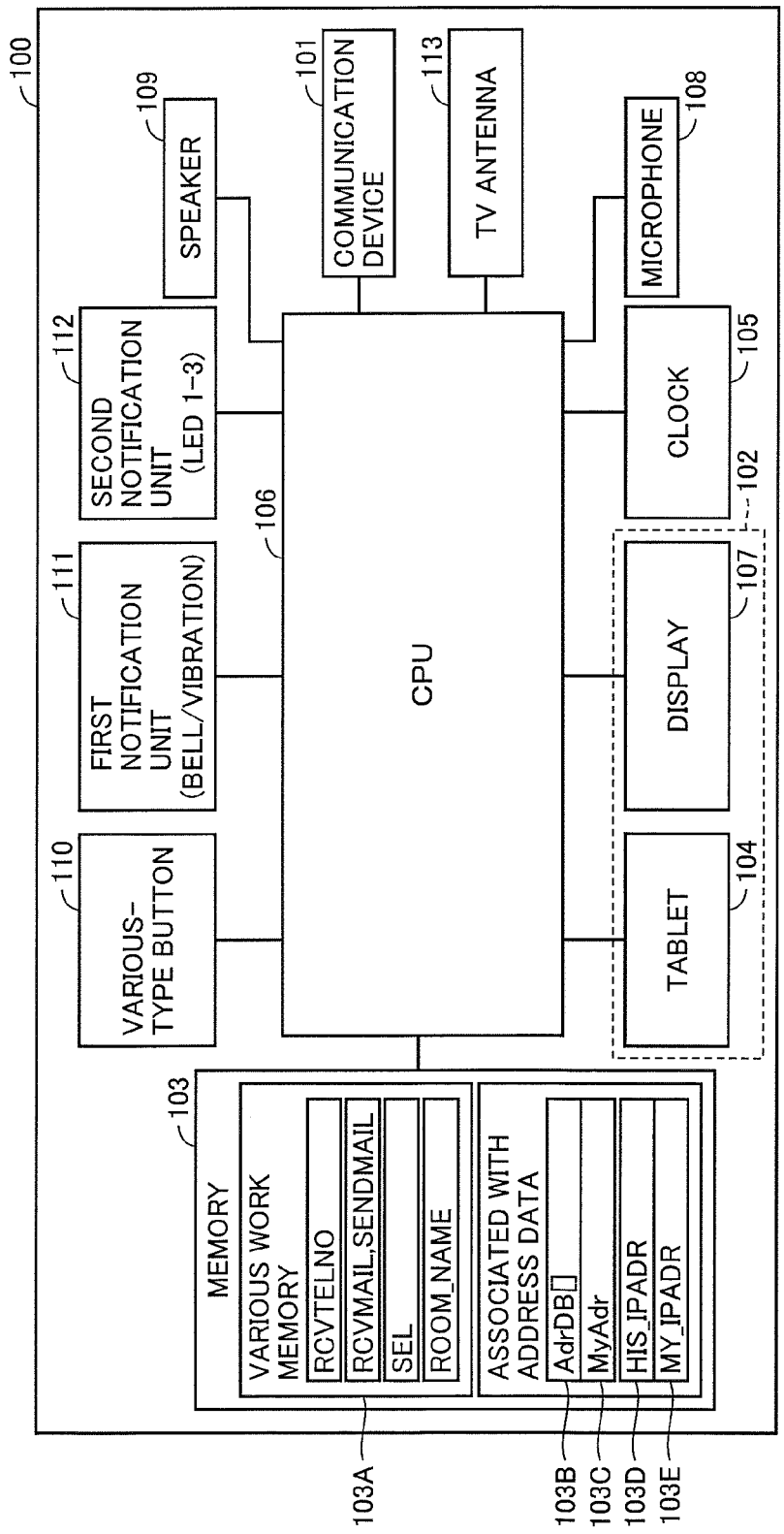
FIG. 6 is a block diagram representing a hardware configuration of the mobile phone of the present embodiment.

The hardware configuration of mobile phone 100 according to the present embodiment will be described hereinafter. FIG. 5 is a pictorial representation of an appearance of mobile phone 100 according to the present embodiment. FIG. 6 is a block diagram of the hardware configuration of mobile phone 100 according to the present embodiment.

As shown in FIGS. 5 and 6, mobile phone 100 according to the present embodiment includes a communication device 101 transmitting/receiving data to/from an external network, a TV antenna 113 receiving television broadcasting, a memory 103 storing a program and various databases, a central processing unit (CPU) 106, a display 107, a microphone to which externally applied sound is received, a speaker 109 providing sound outwards, various-type button 110 receiving input of various information, a first notification unit 111 providing audio informing reception of externally applied communication data and/or conversation signal, and a second notification unit 112 displaying indication of receiving externally applied communication data and/or conversation signal.

Display 107 according to the present embodiment realizes a touch panel 102 constituted of a liquid crystal panel or a CRT. In other words, mobile phone 100 of the present embodiment has a pen tablet 104 provided at the upper side (top side) of display 107. Accordingly, the user can enter hand-drawing such as graphical information to CPU 106 via pen tablet 104 by using a stylus pen 120 or the like.

The user can input hand-drawing by other methods, as set forth below. By using a special pen that outputs infrared ray or ultrasonic wave, the movement of the pen is identified by a reception unit receiving an infrared ray or ultrasonic wave emitted from the pen. In this case, by connecting the relevant reception unit to a device that stores the trace, CPU 106 can receive the trace output from the relevant device as hand-drawing input.

Alternatively, the user can write down, on an electrostatic panel, a hand-drawing image using his/her finger or a pen corresponding to the electrostatic field.

Thus, display 107 (touch panel 102) provides the display of an image or text based on the data output from CPU 106. For example, display 107 shows the motion picture contents received via communication device 101 or TV antenna 113. Display 107 can show a hand-drawing image overlapping with the motion picture contents, based on the hand-drawing data accepted via tablet 104 or accepted via communication device 101.

Various-type button 110 accepts information from a user through key input operation or the like. For example, various-type button 110 includes a TEL button 110A for accepting/dispatching conversation, a mail button 110B for accepting/dispatching mail, a P2P button 110C for accepting/dispatching P2P communication, an address book button 110D for invoking address book data, and an end button 110E for ending various processing. In other words, various-type button 110 selectively accepts, from a user, an instruction to participate in a chat room and/or an instruction to display the mail contents when P2P participation request mail is received via communication device 101.

Furthermore, various-type button 110 may include a button to accept an instruction to start hand-drawing input, i.e. a button for accepting a first input. Various-type button 110 may also include a button for accepting an instruction to end a hand-drawing input, i.e. a button for accepting a second input.

First notification unit 111 issues a ringing sound via a speaker 109 or the like. Alternatively, first notification unit 111 has vibration capability. First notification unit 111 issues sound or causes mobile phone 100 to vibrate when called, when receiving mail, or when receiving P2P participation request mail.

Second notification unit 112 includes a telephone LED (Light Emitting Diode) 112A that blinks when receiving a call, a mail LED 112B that blinks when receiving mail, and P2P LED 112C that blinks when receiving P2P communication.

CPU 106 controls various elements in mobile phone 100. For example, various instructions are accepted from the user via various-type button 110 to transmit/receive data to/from communication device 101 or an external communication terminal via communication device 101 or the network.

Communication device 101 converts communication data from CPU 106 into communication signals for output to an external source. Communication device 101 converts externally-applied communication signals into communication data for input to CPU 106.

Memory 103 is realized by a random access memory (RAM) functioning as a work memory, a read only memory (ROM) for storing a control program and the like, a hard disk storing image data, and the like. FIG. 7(a) is a pictorial representation of the data structure of various work memory 103A constituting memory 103. FIG. 7(b) is a pictorial representation of address book data 103B stored in memory 103. FIG. 7(c) is a pictorial representation of self-terminal data 103C stored in memory 103. FIG. 7(d) is a pictorial representation of IP address data 103D of its own terminal and IP address data 103E of another terminal, stored in memory 103.

As shown in FIG. 7(a), work memory 103A of memory 103 includes a RCVTELNO region storing the telephone number of the caller, a RCVMAIL region storing information associated with reception mail, a SENDMAIL region storing information associated with transmission mail, a SEL region storing the memory number of the selected address, a ROOM-NAME region storing the produced room name, and the like. Work memory 103A does not have to store a telephone number. Information associated with reception mail includes mail text stored in a MAIN region, and the mail address of the mail sender stored in a FROM region of RCVMAIL. Information associated with transmission mail includes mail text stored in the MAIN region, and the mail address of the mail destination stored in the TO region of RCVMAIL.

As shown in FIG. 7(b), address book data 103B has a memory number associated with each address (another communication terminal). Address book data 103B stores the name, telephone number, mail address, and the like for each address in association with each other.

As shown in FIG. 7(c), the user name, telephone number, mail address and the like of its own terminal are stored in self-terminal data 103C.

As shown in FIG. 7(d), IP address data 103D of its own terminal stores the self-terminal IP address. IP address data 103E of another terminal stores the IP address of the other terminal.

Figure 7:
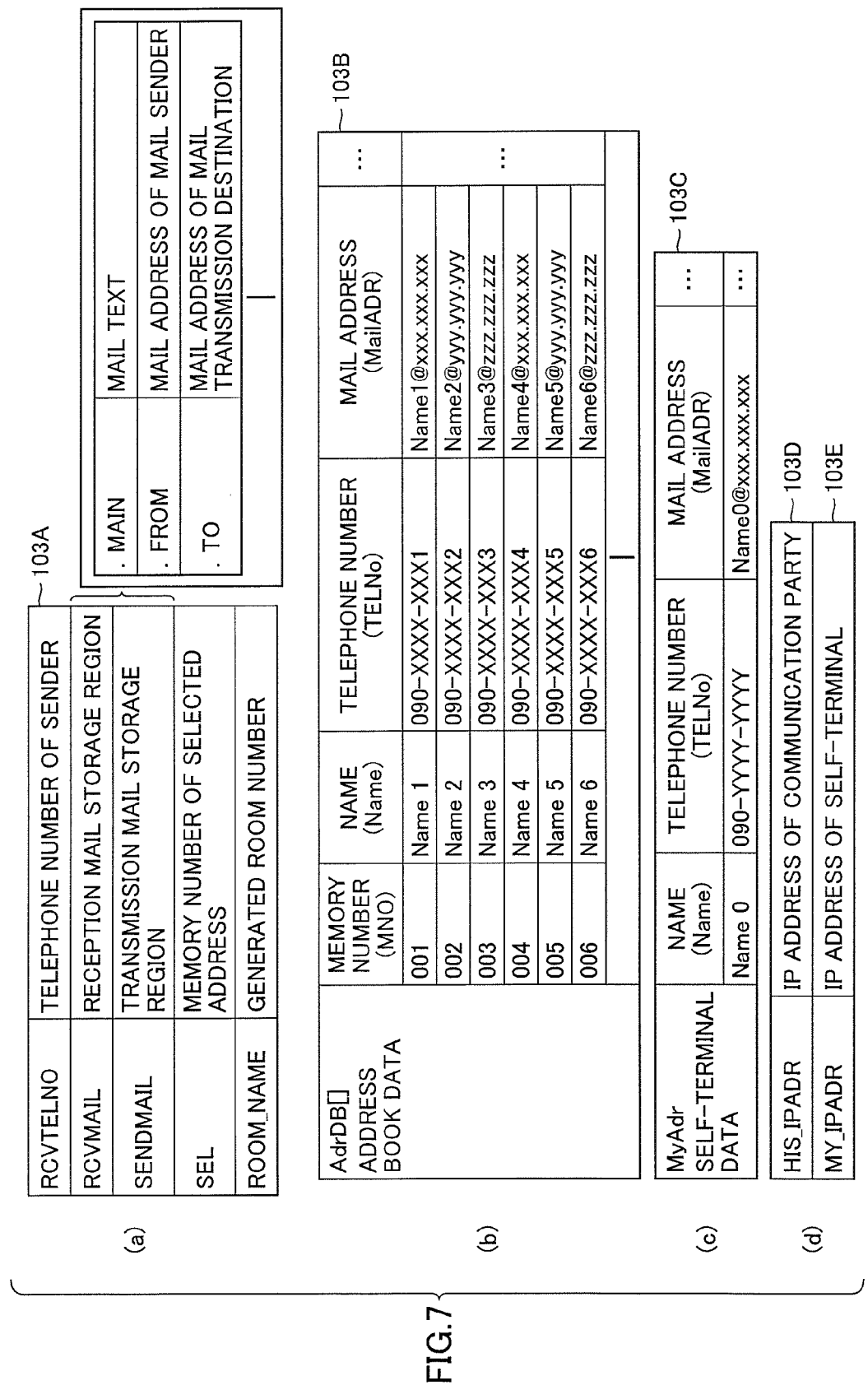
FIG. 7 is a pictorial representation of various data structures constituting a memory according to the present embodiment.

Each mobile phone 100 according to the present embodiment can transmit/receive data to/from another communication terminal by the method set forth above (refer to FIGS. 1-3), using the data shown in FIG. 7.

<Hardware Configuration of Chat Server 400 and Contents Server 600>

The hardware configuration of chat server 400 and contents server 600 according to the present embodiment will be described hereinafter. First, the hardware configuration of chat server 400 will be described.

Figure 8:
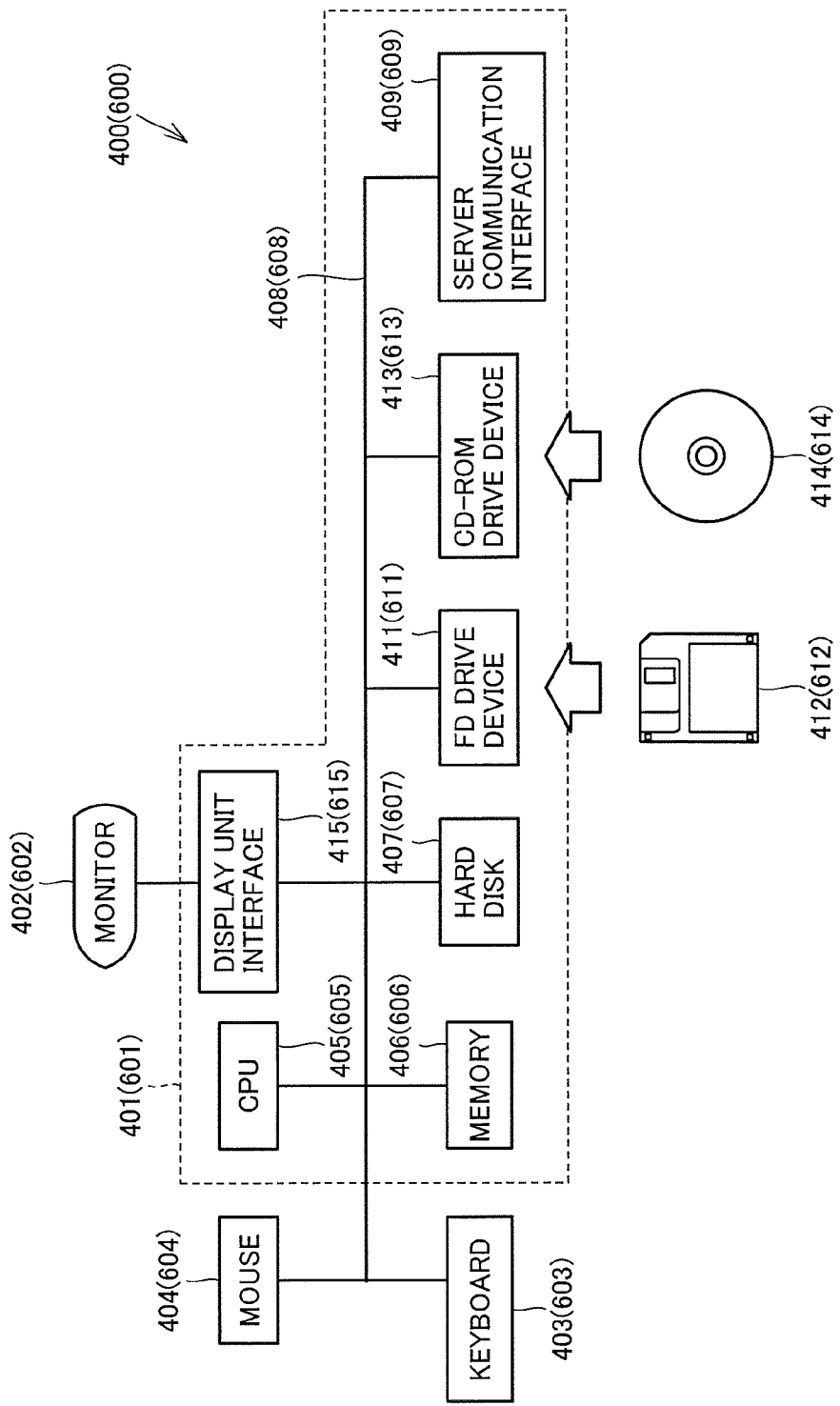
FIG. 8 is a block diagram of a hardware configuration of a chat server according to the present embodiment.

FIG. 8 is a block diagram of the hardware configuration of chat server 400 according to the present embodiment. As shown in FIG. 8, chat server 400 according to the present embodiment includes a CPU 405, a memory 406, a hard disk 407, and a server communication device 409, connected with each other through an internal bus 408.

Memory 406 serves to store various information. For example, memory 406 temporarily stores data required for execution of a program at CPU 405. Hard disk 407 stores a program and/or database for execution by CPU 405. CPU 405 is a device controlling each element in chat server 400 for implementing various operations.

Server communication device 409 converts the data output from CPU 405 into electrical signals for transmission outwards, and converts externally-received electrical signals into data for input to CPU 405. Specifically, server communication device 409 transmits the data from CPU 405 to a device that can be connected on the network such as mobile phone 100, car navigation device 200, personal computer 300, a game machine, an electronic dictionary, and an electronic book via Internet 500 and/or carrier network 700. Server communication device 409 applies data received from a device that can be connected on the network such as mobile phone 100, car navigation device 200, personal computer 300, a game machine, an electronic dictionary, and an electronic book to CPU 405 via Internet 500 and/or carrier network 700.

The data stored in memory 406 or hard disk 407 will be described hereinafter. FIG. 9(a) is a first pictorial representation indicating the data structure of a room management table 406A stored in memory 406 or hard disk 407 in chat server 400. FIG. 9(b) is a second pictorial representation indicating the data structure of room management table 406A stored in memory 406 or hard disk 407 in chat server 400.

As shown in FIGS. 9(a) and (b), room management table 406A stores a room name and an IP address in association. For example, at a certain point of time, a chat room having the room name R, a chat room having the room name S, and a chat room having the room name T are generated at chat server 400, as shown in FIG. 9(a). In the chat room of room name R, a communication terminal having an IP address of A and a communication terminal having an IP address of C are in the room. In the chat room of room name S, a communication terminal having an IP address of B is in the room. In the chat room of room name T, a communication terminal having an IP address of D is in the room.

As will be described afterwards, room name R is determined based on the mail address of the communication terminal having an IP address of A and the mail address of a communication terminal having an IP address of B by CPU 406. When a communication terminal having an IP address of E newly enters the chat room of room name S at the state of FIG. 9(a), room management table 406A stores room name S and IP address E in association, as shown in FIG. 9(b).

Specifically, when first mobile phone 100A requests generation of a new chat room (step S0002 in FIG. 2) at chat server 400, CPU 405 generates a room name based on the mail address of first mobile phone 100A and the mail address of second mobile phone 100B, and then stores the relevant room name and the IP address of first mobile phone 100A in association in room management table 406A.

When second mobile phone 100B requests participation in the chat room to chat server 400 (step S0008 in FIG. 2), CPU 405 stores the relevant room name and IP address of second mobile phone 100B in association in room management table 406A. CPU 406 reads out the IP address of first mobile phone 100A corresponding to the relevant room name from room management table 406A. CPU 406 transmits the IP address of first mobile phone 100A to a second each communication terminal, and the IP address of second mobile phone 100B to first mobile phone 100A.

The hardware configuration of contents server 600 will be described hereinafter. As shown in FIG. 8, contents server 600 according to the present embodiment includes a CPU 605, a memory 606, a hard disk 607, and a server communication device 609, connected with each other through an internal bus 608.

Memory 606 stores various types of information. For example, memory 606 temporarily stores data required for execution of a program at CPU 605. Hard disk 607 stores the program and/or database for execution by CPU 605. CPU 605 is a device for controlling various elements in contents server 600 to implement various operations.

Server communication device 609 transmits data output from CPU 605 into electrical signals for transmission, and converts externally-applied electrical signals into data for input to CPU 605. Specifically, server communication device 609 transmits the data from CPU 605 to the device that can be connected on the network such as mobile phone 100, car navigation device 200, personal computer 300, a game machine, an electronic dictionary, and an electronic book via Internet 500, carrier network 700, and the like. Server communication device 609 inputs the data received from a device that can be connected on the network such as mobile phone 100, car navigation device 200, personal computer 300, a game machine, an electronic dictionary, and an electronic book to CPU 605 via Internet 500, carrier network 700.

Memory 606 or hard disk 615 of contents server 600 stores motion picture contents. CPU 605 of contents server 600 receives a specification of contents from first mobile phone 100A and second mobile phone 100B via server communication device 609. Based on the specification of the contents, CPU 605 of contents server 600 reads out the motion picture contents corresponding to that specification from memory 606 to transmit the relevant contents to first mobile phone 100A and second mobile phone 100B via server communication device 609. Streaming data is one example of the motion picture contents. Contents server 600 distributes the same contents to first mobile phone 100A and second mobile phone 100B substantially at the same time.

CPU 605 of contents server 600 receives a stop instruction (first instruction) or a resumption instruction (second instruction) from first mobile phone 100A or second mobile phone 100B via server communication device 609.

In response to a stop instruction, CPU 605 temporarily stops the procession of the motion picture currently distributed to first mobile phone 100A and second mobile phone 100B. CPU 605 transmits, via server communication device 609, streaming data such that the procession of the motion picture at first mobile phone 100A and second mobile phone 100B is temporarily stopped. In other words, the frame displayed at first mobile phone 100A and second mobile phone 100B at the time when the first instruction was input is continuously displayed as a stationary image at first mobile phone 100A and second mobile phone 100B.

In response to a resumption instruction, CPU 605 resumes the procession of the motion picture. CPU 605 transmits streaming data such that the procession of the motion picture at first mobile phone 100A and second mobile phone 100B is resumed via server communication device 609. In other words, CPU 605 causes the distribution to be resumed continuing from the frame displayed at first mobile phone 100A and second mobile phone 100B corresponding to the point of time when the first instruction was input.

<Chat Communication Processing at Network System>

Figure 10:
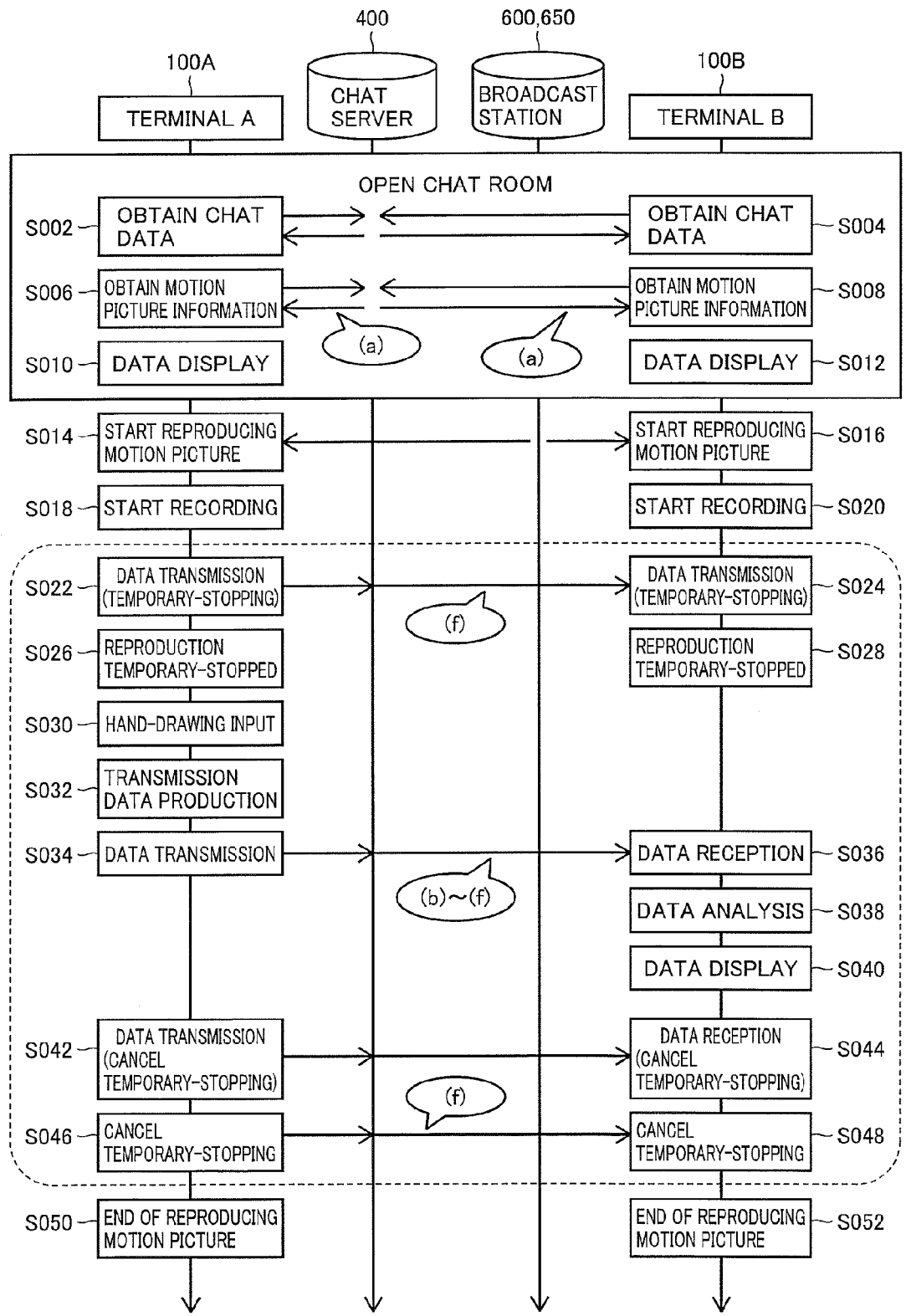
FIG. 10 is a flowchart of the procedure of P2P communication processing at a mobile phone according to the first embodiment.

The chat communication processing at the network system according to the present embodiment will be described hereinafter. FIG. 10 is a flowchart of the procedure of the chat communication processing at the network system of the present embodiment. FIG. 11 is a pictorial representation of the data structure of transmission data according to the present embodiment.

The case where first mobile phone 100A transmits hand-drawing data to second mobile phone 100B will be described hereinafter. First mobile phone 100A and second mobile phone 100B function to transmit/receive data via chat server 400, or through P2P communication without the intervention of chat server 400, after a chat room is opened.

Referring to FIG. 10, CPU 106 of first mobile phone 100A (transmission side) obtains data associated with chat communication from chat server 400 via communication device 101 (step S002). Similarly, CPU 106 of second mobile phone 100B (recipient side) obtains data associated with chat communication from chat server 400 via communication device 101 (step S004).

As used herein "data associated with chat communication" includes the chat room ID, member's terminal information, notification (notice information), the chat contents up to the present time, and the like.

CPU 106 of first mobile phone 100A obtains motion picture information (a) to identify motion picture contents from the chat server via communication device 101 (step S006). As shown in FIG. 11, motion picture information (a) includes the broadcast station code, the broadcasting time, and the like to identify a TV program, for example. Alternatively, motion picture information (a) includes the URL or the like indicating the stored location of the motion picture. In the present embodiment, CPU 106 of one of first mobile phone 100A and second mobile phone 100B transmits motion picture information to chat server 400 via communication device 101.

CPU 106 of the other of first mobile phone 100A and second mobile phone 100B receives the motion picture information from chat server 400 via communication device 101 (step S008). Although the present example is based on the case where first mobile phone 100A and second mobile phone 100B obtain motion picture information during a chat communication, the present invention is not limited thereto. First mobile phone 100A and second mobile phone 100B may obtain common motion picture information prior to a chat communication.

CPU 106 of first mobile phone 100A causes touch panel 102 to display a window for reproducing motion picture contents (step S010). Similarly, CPU 106 of second mobile phone 100B causes touch panel 102 to display a window for reproducing motion picture contents (step S012).

CPU 106 of first mobile phone 100A receives motion picture contents (for example, a TV program) via communication device 101 or TV antenna 113 based on the motion picture information. CPU 106 starts reproducing the motion picture contents via touch panel 102 (step S014). CPU 106 may output the sound of the motion picture contents via speaker 109.

CPU 106 of second mobile phone 100B receives motion picture contents identical to those of first mobile phone 100A via communication device 101 or TV antenna 113 based on the motion picture information. CPU 106 starts reproduction of motion picture contents via touch panel 102 (step S016). CPU 106 may output the sound of the motion picture contents via speaker 109.

CPU 106 of first mobile phone 100A begins to store the received motion picture contents into memory 103 (step S018). CPU 106 of second mobile phone 100B begins to store the received motion picture contents into memory 103 (step S020).

When the user of first mobile phone 100A depresses the hand-drawing start button or stylus pen 120 touches touch panel 102, CPU 106 of first mobile phone 100A transmits pause information (f) to second mobile phone 100B via communication device 101 (step S022). CPU 106 of second mobile phone 100B receives pause information (f) from first mobile phone 100A via communication device 101 (step S024).

First mobile phone 100A may transmit pause information (f) to second mobile phone 100B via chat server 400. Chat server 400 may store pause information (f) received/transmitted at/from first mobile phone 100A or second mobile phone 100B.

More specifically, as shown in FIG. 11, pause information (f) includes, for example, the time from the start of the program (ms), the scene number or frame number of the program, or the like, when first mobile phone 100A accepts the first input. Namely, pause information (f) includes information to cause the reproduction of motion picture contents to pause, and information to identify the scene, frame, or the like of the motion picture contents corresponding to the temporary-stopping timing.

CPU 106 first mobile phone 100A temporarily stops the reproduction of the motion picture contents (step S026). CPU 106 displays the stationary image of the scene or frame that was displayed when the hand-drawing start button was depressed based on multiple image data constituting the motion picture contents.

CPU 106 of second mobile phone 100B similarly stops the reproduction of the motion picture contents temporarily (step S028). CPU 106 displays the stationary image of the scene or frame identified by the pause information based on multiple image data constituting the motion picture contents.

CPU 106 of first mobile phone 100A accepts a hand-drawing input from the user via touch panel 102 (step S030). Specifically, CPU 106 sequentially accepts the touch coordinate data from touch panel 102 at every predetermined time to obtain the change in the touching position (trace) on touch panel 102. As shown in FIG. 11, CPU 106 generates transmission data including hand-drawing clear information (b), information (c) indicating the trace of the touching position, information (d) indicating the line color, and information (e) indicating the line width (step S032).

Hand-drawing clear information (b) includes information (true) for clearing the hand-drawing input up to that time or information (false) for continuing hand-drawing input. At this stage, CPU 106 causes the hand-drawing image to be displayed on the motion picture contents (overlapping with motion picture contents) at display 107.

CPU 106 transmits the transmission data to second mobile phone 100B via communication device 101 (step S034). CPU 106 of second mobile phone 100B receives the transmission data from first mobile phone 100A via communication device 101 (step S036).

First mobile phone 100A may transmit the transmission data to second mobile phone 100B via chat server 400. Chat server 400 may store the transmission data to be transmitted/received by first mobile phone 100A or second mobile phone 100B.

CPU 106 analyzes the transmission data (step S038). CPU 106 causes the hand-drawing image to be displayed on the motion picture contents (overlapping with motion picture contents) at display 107, based on the transmission data (step S040).

When the user of first mobile phone 100A depresses the hand-drawing end button or when stylus pen 120 is lifted off from touch panel 102, CPU 106 of first mobile phone 100A transmits resume information (f) to second mobile phone 100B via communication device 101 (step S042). CPU 106 of second mobile phone 100B receives the resume information (f) from first mobile phone I 00A via communication device 101 (step S044).

First mobile phone 100A may transmit the resume information (f) to second mobile phone 100B via chat server 400. Chat server 400 may store the resume information (f) transmitted/received by first mobile phone 100A or second mobile phone 100B.

More specifically, as shown in FIG. 11, resume information (f) includes, for example, information to resume the reproduction of motion picture contents. Resume information (f) may include information to identify the stopped time of motion picture contents. Resume information (f) may include the time from the start of a program (ms), or the scene number or frame number of a program at the point of time when first mobile phone 100A accepts the first input.

CPU 106 of first mobile phone 100A resumes the reproduction of the motion picture contents (step S046). In the present embodiment, CPU 106 resumes the reproduction of the motion picture contents from the scene or frame that was temporarily stopped, based on the motion picture contents stored in memory 103.

First mobile phone 100A may transmit, directly by P2P communication or via chat server 400, a message indicating that temporary-stopping has been canceled to second mobile phone 100B. Chat server 400 may store the message transmitted/received at first mobile phone 100A or second mobile phone 100B.

CPU 106 of second mobile phone 100B resumes the reproduction of the motion picture contents (step S048). CPU 106 resumes the reproduction of the motion picture contents starting from a scene or frame identified by the resume information, based on the motion picture contents stored in memory 103.

First mobile phone 100A and second mobile phone 100B may be set to begin reproducing the received motion picture contents after accepting the second input or resume information without recording the motion picture contents.

When the reproduction of the motion picture contents identified by the motion picture information ends, CPU 106 of first mobile phone 100A closes the window for motion picture contents (step S050). When the reproduction of the motion picture contents identified by the motion picture information ends, CPU 106 of second mobile phone 100B closes the window for motion picture contents (step S052).

<Input Processing at Mobile Phone 100>

Figure 12:
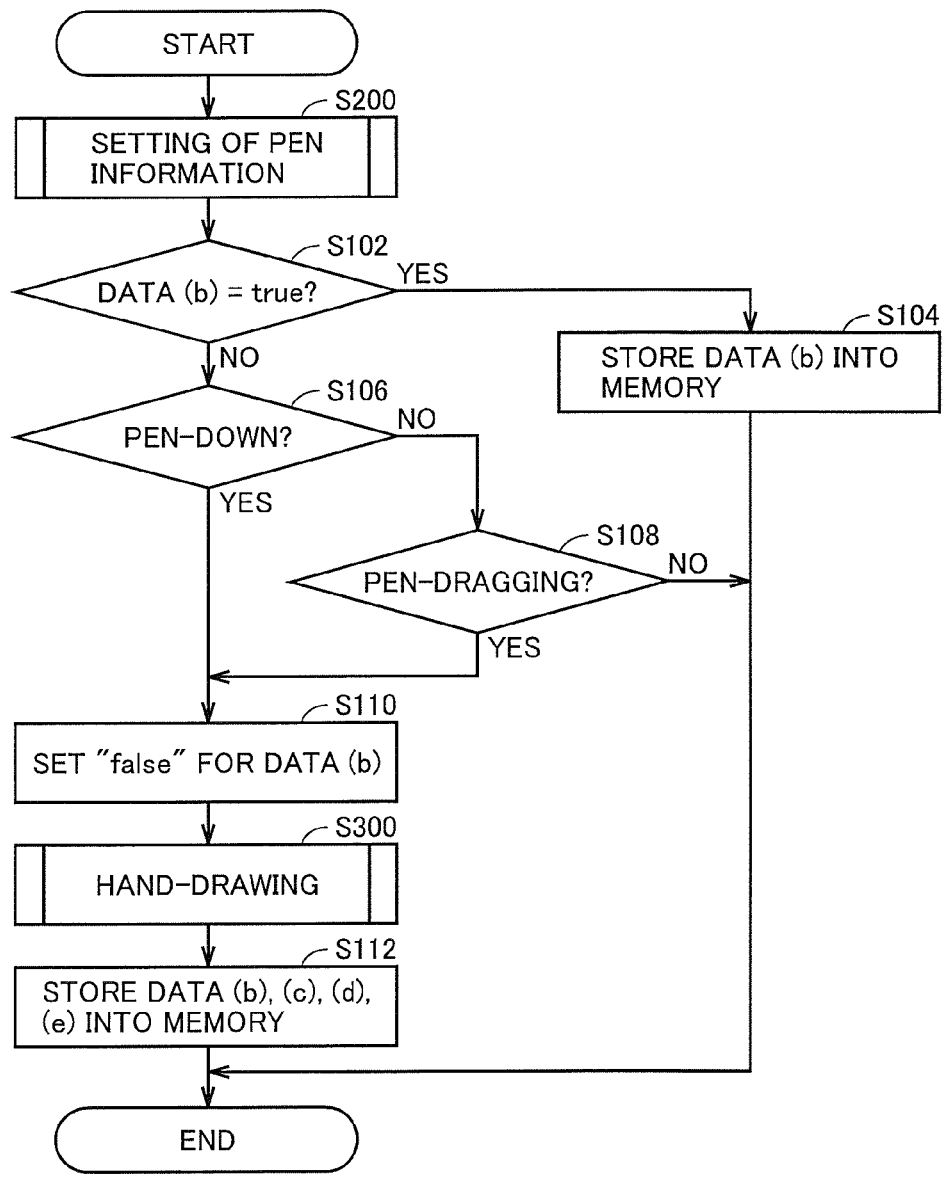
FIG. 12 is a flowchart of the procedure of input processing at the mobile phone according to the first embodiment.

The input processing at mobile phone 100 according to the present embodiment will be described hereinafter. FIG. 12 is a flowchart of the procedure of the input processing at mobile phone 100 of the present embodiment.

Referring to FIG. 12, CPU 106 executes pen information setting processing (step S200) when input to mobile phone 100 is initiated. Pen information setting processing (step S200) will be described afterwards.

When the pen information setting process (step S200) ends, CPU 106 determines whether data (b) is true or not (step S102). When data (b) is true (YES at step S102), CPU 106 stores data (b) in memory 103 (step S104). CPU 106 ends the input processing.

When data (b) is not true (NO at step S102), CPU 106 determines whether stylus pen 120 has touched touch panel 102 or not (step S106). In other words, CPU 106 determines whether pen-down has been detected or not.

When pen-down is not detected (NO at step S106), CPU 106 determines whether the touching position of stylus pen 120 against touch panel 102 has changed or not (step S108). In other words, CPU 106 determines whether pen-dragging has been detected or not. When pen-dragging has not been detected (NO at step S108), CPU 106 ends the input processing.

When CPU 106 detects pen-down (YES at step S106), or pen-dragging (YES at step S108), CPU 106 sets "false" for data (b) (step S110). CPU 106 executes the hand-drawing processing (step S300). The hand-drawing process (step S300) will be described afterwards.

When the hand-drawing processing (step S300) ends, CPU 106 stores data (b) (c), (d), and (e) in memory 103 (step S112). CPU 106 ends the input processing.

<Pen Information Setting Processing at Mobile Phone 100>

Figure 13:
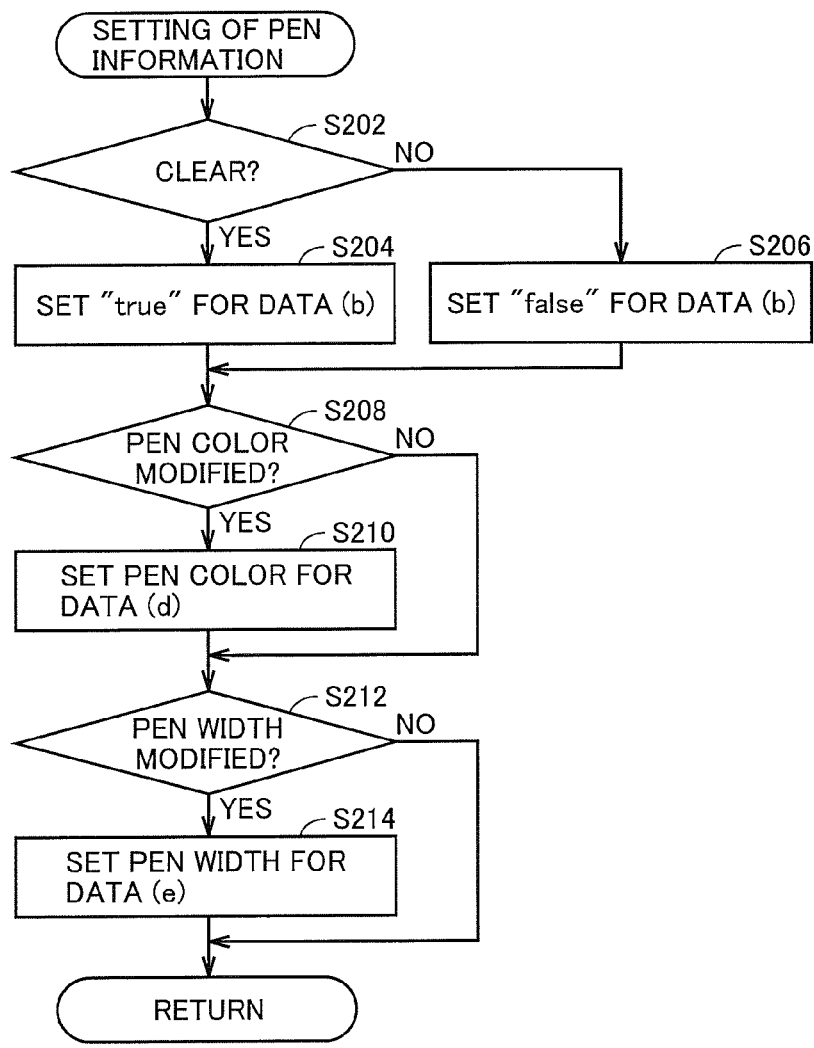
FIG. 13 is a flowchart of the procedure of pen information setting processing at the mobile phone according to the present embodiment.

The pen information setting processing at mobile phone 100 according to the present embodiment will be described hereinafter. FIG. 13 is a flowchart of the procedure of the pen information setting processing at mobile phone 100 of the present embodiment.

Referring to FIG. 13, CPU 106 determines whether an instruction to clear the hand-drawing image has been accepted or not from the user via touch panel 102 (step S202). When an instruction to clear the hand-drawing image is accepted from the user (YES at step S202), CPU 106 sets "true" for data (b) (step S204). CPU 106 executes the processing from step S208.

When an instruction to clear the hand-drawing image has not been accepted from the user (NO at step S202), CPU 106 sets "false" for data (e) (step S206). CPU 106 determines whether an instruction to modify the color of the pen has been accepted or not from the user via touch panel 102 (step S208). When an instruction to modify the color of the pen has not been accepted from the user (NO at step S208), CPU 106 executes the process starting from step S212.

When an instruction to modify the color of the pen has been accepted from the user (YES at step S208), CPU 106 sets the modified color of the pen for data (d) (step S210). CPU 106 determines whether an instruction to modify the width of the pen has been accepted or not from the user via touch panel 102 (step S212). When an instruction to modify the width of the pen has not been accepted from the user (NO at step S212), CPU 106 ends the pen information setting processing.

When an instruction to modify the width of the pen has been accepted from the user (YES at step S212), CPU 106 sets the modified width of the pen for data (e) (step S214). CPU 106 ends the pen information setting processing.

<Hand-Drawing Processing at Mobile Phone 100>

Figure 14:
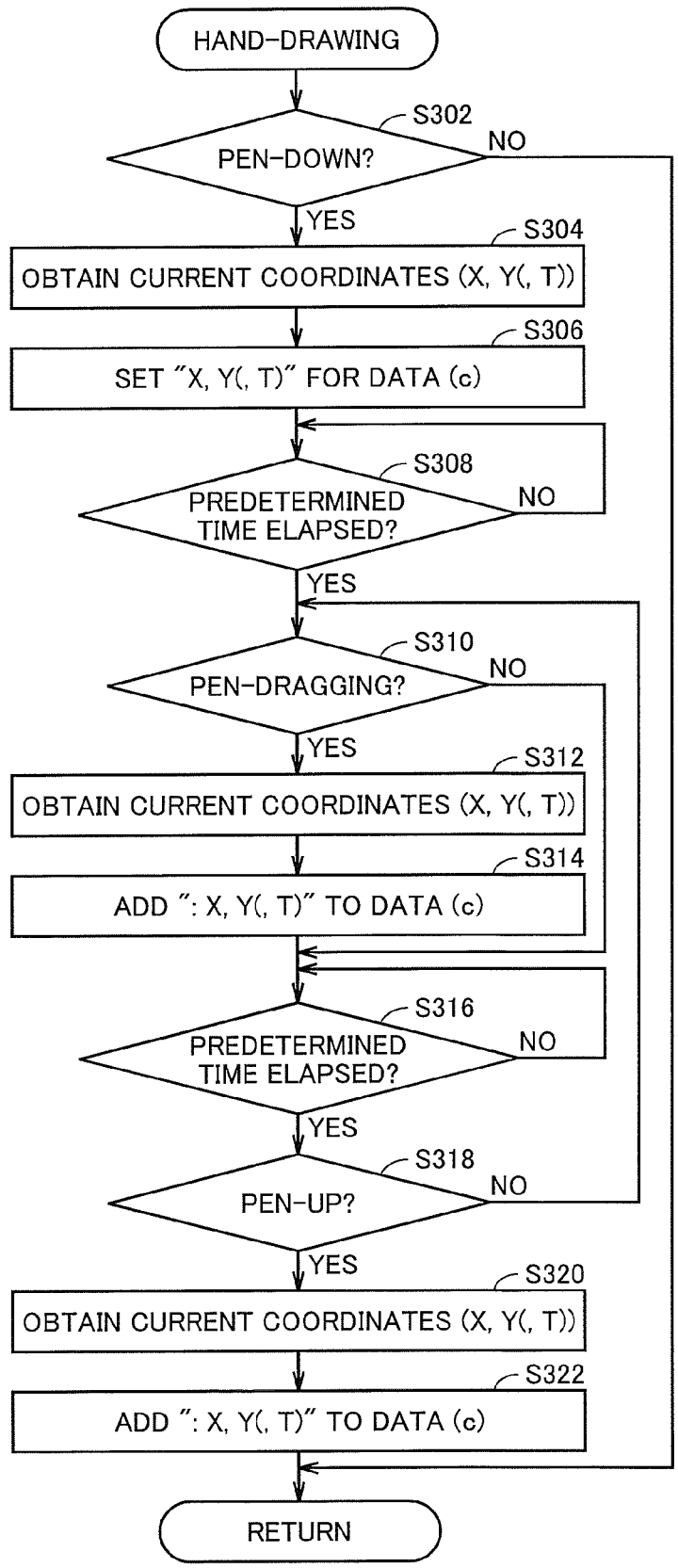
FIG. 14 is a flowchart of the procedure of hand-drawing processing at the mobile phone according to the present embodiment.

The hand-drawing processing at mobile phone 100 according to the present embodiment will be described hereinafter. FIG. 14 is a flowchart of the procedure of the hand-drawing processing at mobile phone 100 of the present embodiment.

Referring to FIG. 14, CPU 106 determines, via touch panel 102, whether stylus pen 120 is currently in contact with touch panel 102 (step S302). When stylus pen 120 is not touching touch panel 102 (NO at step S302), CPU 106 ends the hand-drawing processing.

When stylus pen 120 is touching touch panel 102 (YES at step S302), CPU 106 obtains via touch panel 102 the touching coordinates (X, Y) of stylus pen 120 on touch panel 102 and current time (T) (step S304). CPU 106 sets "X, Y, T" for data (c) (step S306).

CPU 106 determines whether a predetermined time has elapsed from the time of obtaining the previous coordinates (step S308). When the predetermined time has not elapsed (NO at step S308), CPU 106 repeats the processing from step S308.

When the predetermined time has elapsed (YES at step S308), CPU 106 determines whether pen-dragging has been detected or not via touch panel 102 (step S310). When pen-dragging has not been detected (NO at step S310), CPU 106 executes the processing from step S316.

When pen-dragging has been detected (YES at step S310), CPU 106 obtains via touch panel 102 the touching position coordinates (X, Y) of stylus pen 120 on touch panel 102 and the current time (T) (step S312). CPU 106 adds ": X, Y, T" to data (c) (step S314). CPU 106 determines whether a predetermined time has elapsed from obtaining the previous touching coordinates (step S316). When the predetermined time has not elapsed (NO at step S316), CPU 106 repeats the processing from step S316.

When the predetermined time has elapsed (YES at step S316), CPU 106 determines whether pen-up has been detected via touch panel 102 (step S318). When pen-up has not been detected (NO at step S318), CPU 106 repeats the processing from step S310.

When pen-up has been detected (YES at step S318), CPU 106 obtains via touch panel 102 the touching position coordinates (X, Y) of the stylus pen on touch panel 102 and the current time (T) (step S320). CPU 106 adds ": X, Y, T" to data (c) (step S322). CPU 106 ends the hand-drawing processing.

<Display Processing at Mobile Phone 100>

Figure 15:
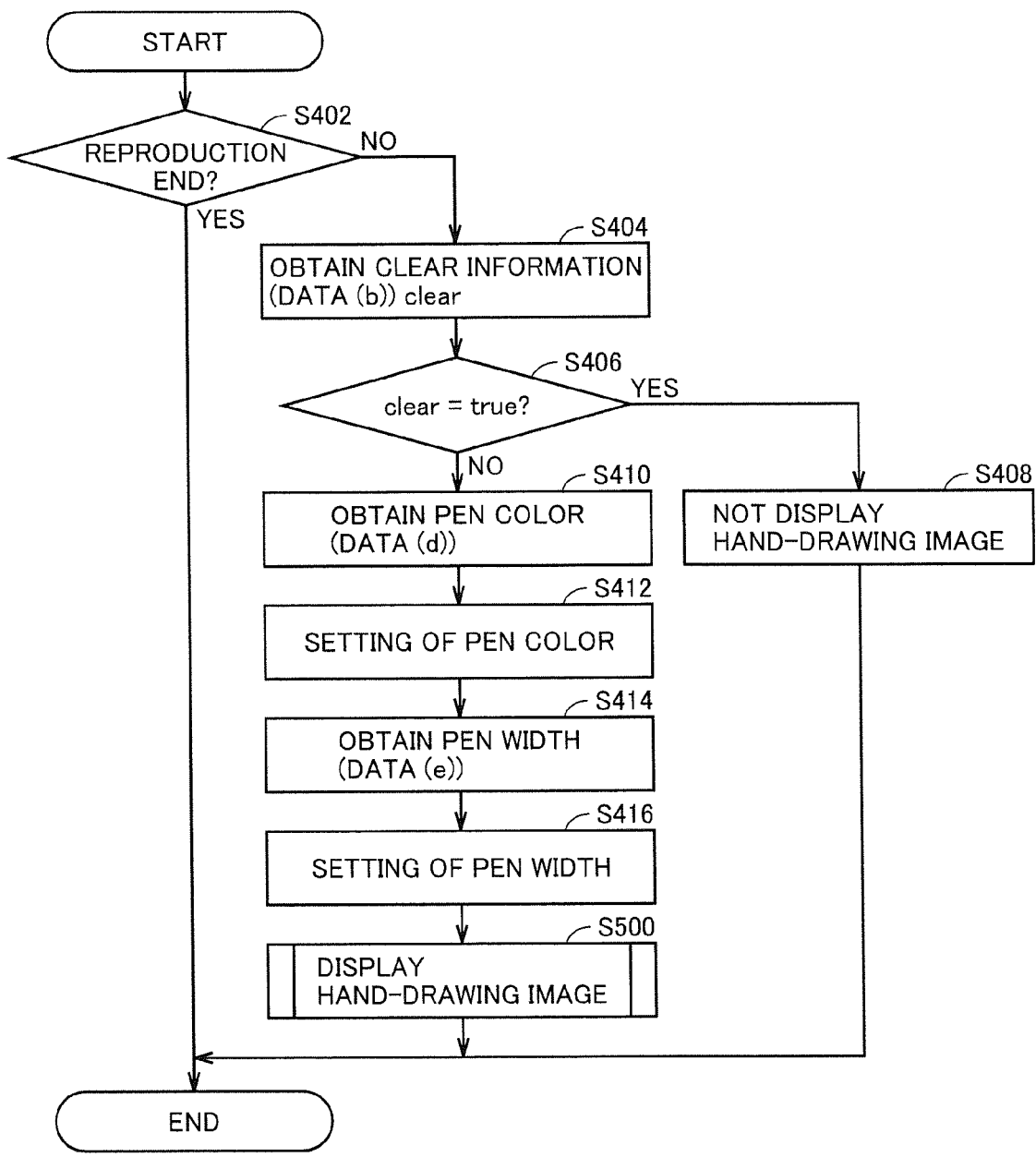
FIG. 15 is a flowchart of the procedure of display processing at the mobile phone according to the present embodiment.

Display processing at mobile phone 100 according to the present embodiment will be described hereinafter. FIG. 15 is a flowchart of the procedure of the display processing at mobile phone 100 of the present embodiment.

Referring to FIG. 15, CPU 106 determines whether reproduction of the motion picture contents has ended or not (step S402). When the reproduction of the motion picture contents has ended (YES at step S402), CPU 106 ends the display processing.

When the reproduction of the motion picture contents has not ended (NO at step S402), CPU 106 obtains clear information "clear" (data (b)) (step S404). CPU 106 determines whether clear information "clear" is "true" or not (step S406). When clear information "clear" is "true" (YES at step S406), CPU 106 sets the hand-drawing image at "not display" (step S408). CPU 106 ends the display processing.

When clear information "clear" is not "true" (NO at step S406), CPU 106 obtains the color of the pen (data (d)) (step S410). CPU 106 resets the color of the pen (step S412). CPU 106 obtains the width of the pen (data (e)) (step S414). CPU 106 resets the width of the pen (step S416). Then, CPU 106 executes the hand-drawing image display processing (step S500). The hand-drawing image display processing (step S500) will be described afterwards. CPU 106 ends the display processing.

<Exemplary Application of Display Processing at Mobile Phone 100>

Figure 16:
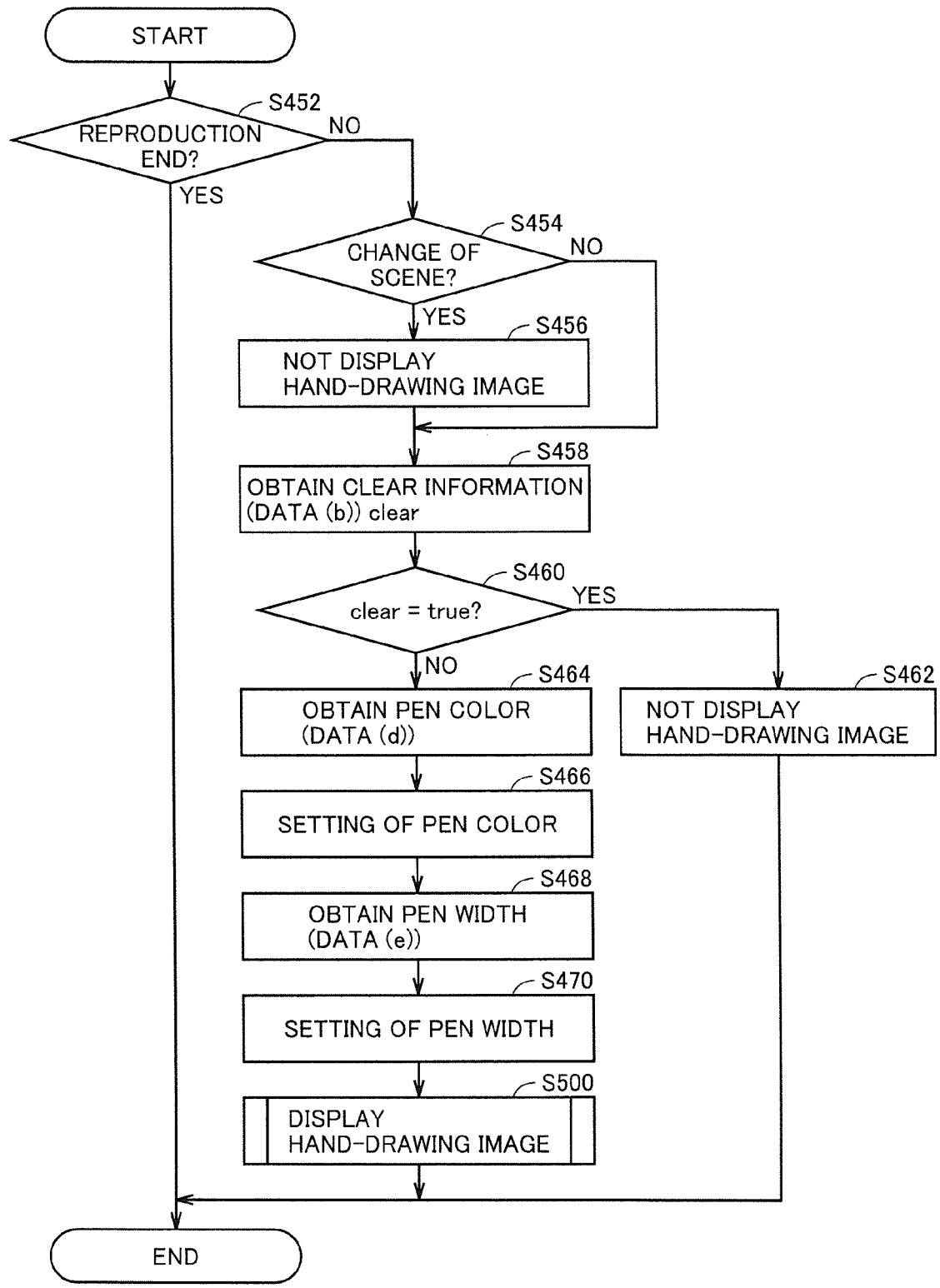
FIG. 16 is a flowchart of the procedure of an exemplary application of display processing at the mobile phone according to the present embodiment.

An exemplary application of display processing at mobile phone 100 according to the present embodiment will be described hereinafter. FIG. 16 is a flowchart of the procedure of an application of display processing at mobile phone 100 according to the present embodiment. This exemplary application is directed to eliminating (resetting) the hand-drawing image displayed up to that time when the scene has changed in addition to clear information.

Referring to FIG. 16, CPU 106 determines whether reproduction of the motion picture contents has ended or not (step S452). When the reproduction of the motion picture contents has ended (YES at step S452), CPU 106 ends the display processing.

When the reproduction of the motion picture contents has not ended (NO at step S452), CPU 106 determines whether the scene of motion picture contents has changed or not (step S454). When the scene of the motion picture contents has not changed (NO at step S454), CPU 106 executes the processing from step S458.

When the scene of the motion picture contents has been changed (YES at step S454), CPU 106 sets the hand-drawing image that has been displayed up to that time at "not-display" (step S456). CPU 106 obtains clear information "clear" (data (b)) (step S458). CPU 106 deter nines whether clear information "clear" is "true" or not (step S460). When clear information clear is true "true" (YES at step S460), CPU 106 sets the hand-drawing image that has been displayed up to that time at "not-display" (step S462). CPU 106 ends the display processing.

When clear information "clear" is not "true" (NO at step S460), CPU 106 obtains the color of the pen (data (d)) (step S464). CPU 106 resets the color of the pen (step S466). CPU 106 obtains the width of the pen (data (e)) (step S468). CPU 106 resets the width of the pen (step S470). Then, CPU 106 executes the hand-drawing image display processing (step S500). The hand-drawing image display processing (step S500) will be described afterwards. CPU 106 ends the display processing.

<Hand-Drawing Image Display Processing at Mobile Phone 100>

Figure 17:
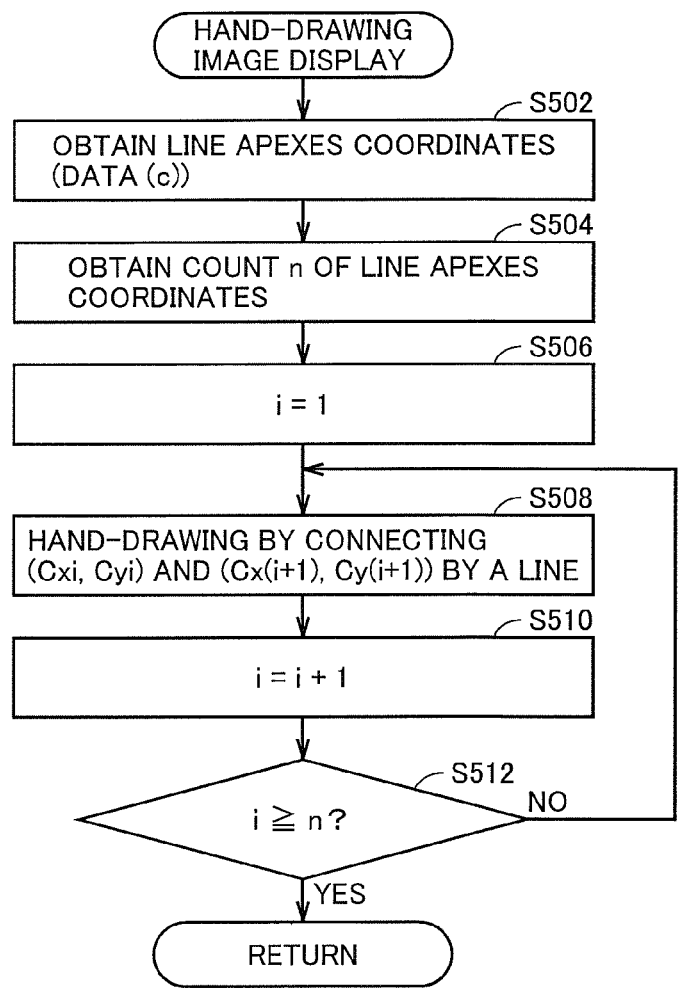
FIG. 17 is a flowchart of the procedure of hand-drawing image display processing at the mobile phone according to the present embodiment.

A hand-drawing image display processing at mobile phone 100 according to the present embodiment will be described hereinafter. FIG. 17 is a flowchart of the procedure of hand-drawing image display processing at mobile phone 100 according to the present embodiment.

Referring to FIG. 17, CPU 106 obtains the coordinates (data (c)) of the apexes of the hand-drawing stroke (step S502). CPU 106 obtains the count "n" of apexes coordinates of the hand-drawing stroke (step S504). CPU 106 inserts 1 to a variable i (step S506).

CPU 106 uses touch panel 102 to draw a hand-drawing stroke by connecting coordinates (Cxi, Cyi) and coordinates (Cx(i+1), Cy(i+1)) by a line (step S508). CPU 106 increments variable i (step S510).

CPU 106 determines whether variable i is greater than or equal to the count n (step S512). When variable i is less than n (NO at step S512), CPU 106 repeats the processing from step S508. When variable i is greater than or equal to the count n (YES at step S512), CPU 106 ends the hand-drawing image display processing.

<Exemplary Application of Hand-Drawing Image Display Processing at Mobile Phone 100>

Figure 18:
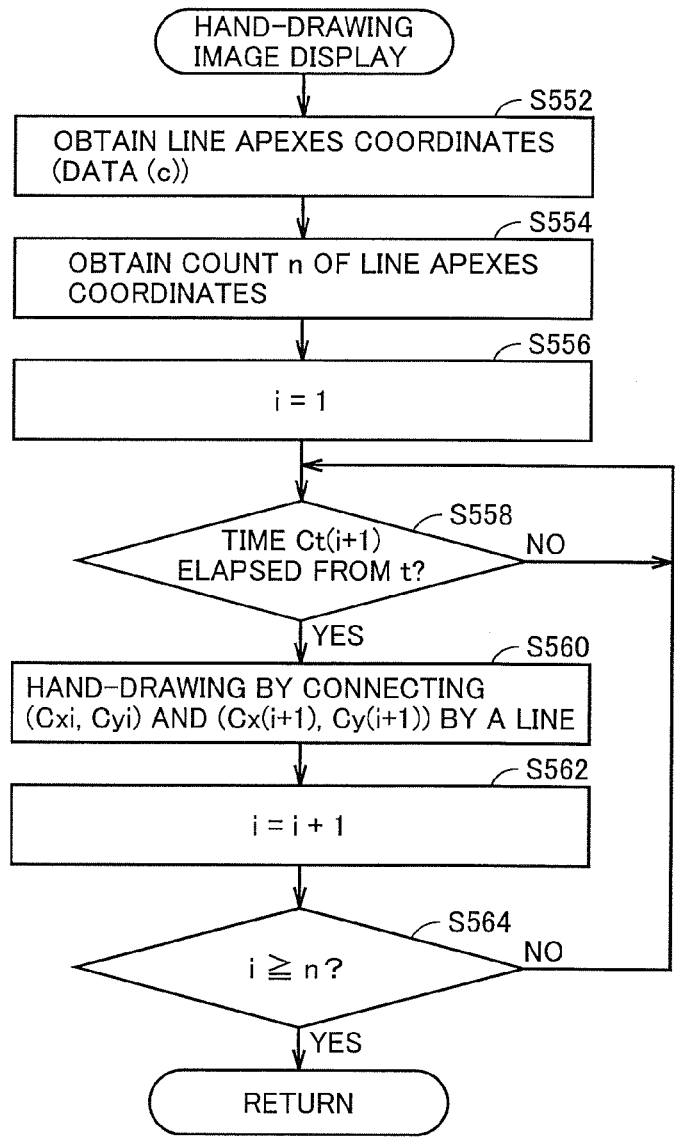
FIG. 18 is a flowchart of the procedure of an exemplary application of hand-drawing image display processing at the mobile phone according to the present embodiment.

An exemplary application of the hand-drawing image display processing at mobile phone 100 of the present embodiment will be described hereinafter. FIG. 18 is a flowchart of the procedure of an exemplary application of hand-drawing image display processing at mobile phone 100 according to the present embodiment. The processing for displaying a hand-drawing image at the input speed of the hand-drawing image will be described here.

Referring to FIG. 18, CPU 106 obtains the coordinates of the apex of the hand-drawing stroke (data (c)) (step S552). CPU 106 obtains the count "n" of apexes coordinates of the hand-drawing stroke (step S554). CPU 106 inserts 1 to variable i (step S556).

CPU 106 determines (step S558) whether a time of Ct(i+1) has elapsed from point of time t corresponding to the previous drawing step (step S560 described afterwards). When the time Ct(i+1) has not elapsed from time t (NO at step S558), CPU 106 repeats the processing from step S558.

When the time Ct(i+1) has elapsed from time t (YES at step S558), CPU 106 uses touch panel 102 to draw a hand-drawing stroke by connecting coordinates (Cxi, Cyi) and coordinates (Cx(i+1), Cy(i+1)) by a line (step S560). CPU 106 increments variable i (step S562).

CPU 106 determines whether variable i is greater than or equal to the count n (step S564). When variable i is less than n (NO at step S564), CPU 106 repeats the processing from step S558. When variable i is greater than or equal to the count n (YES at step S564), CPU 106 ends the hand-drawing image display processing.

Second Embodiment

A second embodiment of the present invention will be described hereinafter. At network system 1 according to the first embodiment set forth above, contents server 600 functions to transmit contents (motion picture) to first mobile phone 100A or second mobile phone 100B, independent of the chat status of first mobile phone 100A and second mobile phone 100B. In other words, contents server 600 causes the motion picture to proceed while first mobile phone 100A or second mobile phone 100B stops the procession of the motion picture. Therefore, first mobile phone 100A or second mobile phone 100B must store the (distributed) motion picture corresponding to the period of time during which the motion picture was stopped.

Network system 1 of the present embodiment is directed to temporarily stopping the contents (motion picture) currently distributed according to the chat status of first mobile phone 100A and second mobile phone 100B. In other words, first mobile phone 100A and second mobile phone 100B do not have to store the motion picture corresponding to the period of time during which the motion picture was stopped. However, contents server 600 must receive, from first mobile phone 100A and second mobile phone 100B, information indicating the stop or resumption of the procession of the motion picture currently distributed.

Figure 9:
FIG. 9 is a pictorial representation of a data structure of a room management table stored in a memory or hard disk of the chat server according to the present embodiment.

Description of elements similar to those of network system 1 of the first embodiment will not be repeated. For example, the overall configuration of network system 1 as shown in FIG. 1, the overall operation overview of network system 1 as shown in FIGS. 2 and 3, the hardware configuration of mobile phone 100 as shown in FIGS. 5 and 6, the hardware configuration of chat server 400 and contents server 600 as shown in FIGS. 8 and 9, and the like are similar to those of the present embodiment. Therefore description thereof will not be repeated.

<Operation Overview Related to Hand-Drawing Data Transmission/Reception of Network System 1>

Figure 19:
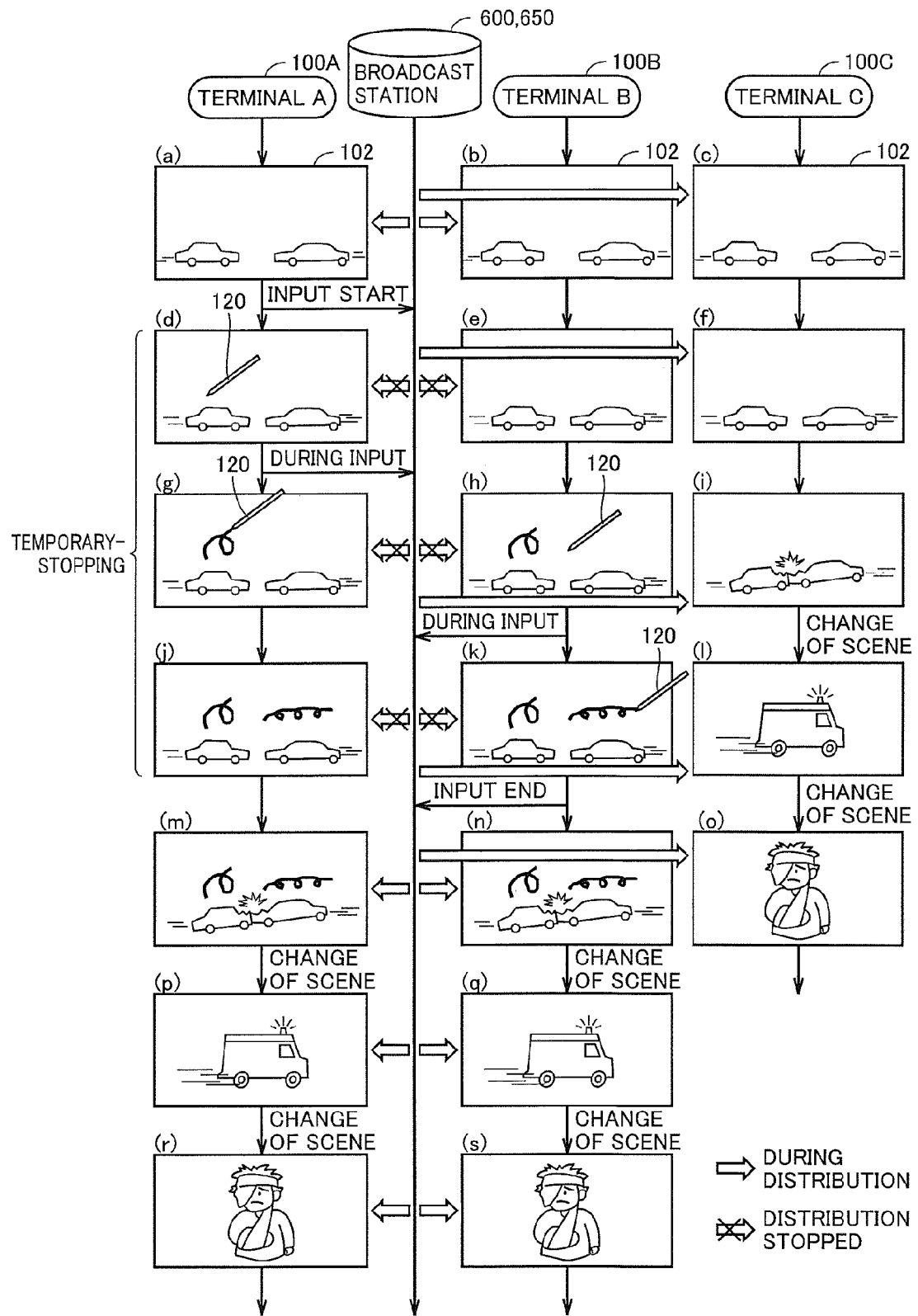
FIG. 19 is a pictorial representation of the operation overview related to transmission and reception of hand-drawing data according to a second embodiment.

The operation overview related to transmission/reception of hand-drawing data according to the present embodiment will be described in detail hereinafter. FIG. 19 is a pictorial representation of the operation overview related to transmission/reception of hand-drawing data according to the present embodiment.

The following description is based on the case where first mobile phone 100A and second mobile phone 100B carry out chat communication (transmission/reception of hand-drawing image) directly without the intervention of the server. However, first mobile phone 100A and second mobile phone 100B may carry out a chat communication (transmission/ reception of hand-drawing image) via the server, as will be described hereinafter.

Referring to FIGS. 19(a) and (b), first mobile phone 100A and second mobile phone 100B receive the same motion picture contents (for example, a TV program) from contents server 600, and display the relevant motion picture contents. As used herein, motion picture contents includes streaming data, for example, that can be controlled by contents server 600 as to the reproduction or temporary-stopping at first mobile phone 100A and second mobile phone 100B. At that time, third mobile phone 100C not participating in the chat communication may receive and display the same motion picture contents.

Referring to FIG. 19(d)-(f), the motion picture contents proceed over time. Namely, the displayed image continuously changes at first mobile phone 100A, second mobile phone 100B and third mobile phone 100C. At this stage, first mobile phone 100A, second mobile phone 100B and third mobile phone 100C may output sound corresponding to the motion picture contents.

Referring to FIG. 19(d), when the user of first mobile phone 100A initiates input of a hand-drawing image, first mobile phone 100A transmits to contents server 600 a message indicating that input of a hand-drawing image is started, or a message indicating that procession of the motion picture contents is temporarily stopped. Contents server 600 receives the aforementioned message (start message), and temporarily stops the procession of the motion picture contents. For example, contents server 600 transmits information indicating that the frame will not change.

Accordingly, referring to FIGS. 19(d) and (e), the procession of the motion picture contents is caused to pause at first mobile phone 100A and second mobile phone 100B. In fact, the procession of the motion picture contents seems to stop at first mobile phone 100A and second mobile phone 100B. In other words, it looks as if the latest stationary image is displayed.

More specifically, when the user touches touch panel 102 using stylus pen 120 or her/his finger, a determination is made that first mobile phone 100A has accepted the first instruction. Alternatively, when the user depresses the hand-drawing start button, a determination is made that first mobile phone 100A has accepted the first instruction. First mobile phone 100A transmits a start message to contents server 600 according to the first instruction.

Referring to FIG. 19(f), third mobile phone 100C does not receive the start message at this stage since it is not participating in the chat communication. Third mobile phone 100C continues to reproduce the motion picture contents from contents server 600 in a usual manner.

Referring to FIG. 19(g), when the user enters a hand-drawing image at first mobile phone 100A, first mobile phone 100A displays a hand-drawing image on touch panel 102. First mobile phone 100A transmits the hand-drawing image data to second mobile phone 100B via P2P communication.

Referring to FIG. 19(h), second mobile phone 100B receives and displays the hand-drawing data from first mobile phone 100A.

Referring to FIG. 19(i), third mobile phone 100C does not receive the start message or the hand-drawing image at this stage since it is not participating in the chat communication. Third mobile phone 100C continues to reproduce the motion picture contents from contents server 600 in a usual manner.

Referring to FIG. 19(k), when the user enters a hand-drawing image at second mobile phone 100B, second mobile phone 100B displays the hand-drawing image on touch panel 102. Second mobile phone 100B transmits the hand-drawing data to first mobile phone 100A via P2P communication.

Referring to FIG. 19(j), first mobile phone 100A receives and displays the hand-drawing data from second mobile phone 100B.

Referring to FIG. 19(l), third mobile phone 100C does not receive the start message or the hand-drawing image at this stage since it is not participating in the chat communication. Third mobile phone 100C continues to reproduce the motion picture contents in a usual manner.

Referring to FIG. 19(m), when the users of the first mobile phone 100A and second mobile phone 100B end input of hand-drawing images, first mobile phone 100A transmits to contents server 600 a message indicating that input of the hand-drawing image has ended or a message indicating that distribution of the motion picture is to be resumed. Contents server 600 receives the aforementioned message (end message), and resumes the procession of the motion picture contents from the stopped position.

Accordingly, referring to FIGS. 19(m) and (n), procession of the motion picture contents is resumed at first mobile phone 100A and second mobile phone 100B. In fact, the procession of the motion picture contents seems to be resumed at first mobile phone 100A and second mobile phone 100B.

More specifically, when stylus pen 120 or a finger is not in contact with touch panel 102 of first mobile phone 100A and hand-drawing data from second mobile phone 100B is no longer received, a determination is made that first mobile phone 100A has accepted the second instruction. Alternatively, a determination is made that first mobile phone 100A has accepted the second instruction when the user depresses the hand-drawing end button. First mobile phone 100A sends an end message to contents server 600 according to the second instruction.

Referring to FIG. 19(o), third mobile phone 100C continues to reproduce the motion picture contents in the usual manner at this stage.

Contents server 600 determines whether the scene of the reproducing motion picture contents has been switched or not during distribution of the motion picture contents. Referring to FIGS. 19(p) and (q), contents server 600 transmits scene change information to first mobile phone 100A and second mobile phone 100B when a determination is made that the scene of the motion picture contents has been switched. First mobile phone 100A and second mobile phone 100B receive the scene change information and delete the hand-drawing image drawn up to that time. This is because the possibility of the hand-drawing image drawn up to that time being related to the scene prior to switching is high.

Each of first mobile phone 100A and second mobile phone 100B may determine, during reproduction of the motion picture contents, whether the scene of the reproducing motion picture contents has changed or not. In other words, referring to FIGS. 19(p) and (q), first mobile phone 100A and second mobile phone 100B may delete the hand-drawing image drawn up to that time when a determination is made that the scene in the motion picture contents has changed.

When contents server 600 determines that the scene in the motion picture contents has been switched at FIGS. 19(r) and (s), scene change information is transmitted to first mobile phone 100A and second mobile phone 100B. First mobile phone 100A and second mobile phone 100B receive the scene change information to delete the hand-drawing image drawn up to that time. Alternatively, each of first mobile phone 100A and second mobile phone 100B may determine, during reproduction of the motion picture contents, whether the scene of the reproducing motion picture contents has changed or not. In other words, referring to FIGS. 19(p) and (q), first mobile phone 100A and second mobile phone 100B may delete the hand-drawing image drawn up to that time when a determination is made that the scene in the motion picture contents has changed.

In FIG. 19, first mobile phone 100A that has accepted the first input accepts the second input. During the stopping of the motion picture contents, first mobile phone 100A and second mobile phone 100B are set such that both can input a hand-drawing image.

In this context, network system 1 of the present embodiment is also applicable to the configuration set forth below. First, the configuration related to second instruction will be described.

(1) Only first mobile phone 100A that has accepted the first instruction (that has transmitted the start information) may allow acceptance of the second instruction.

(2) Only second mobile phone 100B that has not accepted the first instruction (that has received the start information) may allow acceptance of the second instruction.

(3) Both first mobile phone 100A and second mobile phone 100B may allow acceptance of the second instruction, regardless of whether the first instruction has been accepted or not (regardless of whether transmitting/receiving start information).

Input of a hand-drawing image will be described hereinafter.

(1) Only first mobile phone 100A that has accepted the first instruction (that has transmitted the start information) may allow acceptance (allow transmission) of the hand-drawing image input.

(2) Both first mobile phone 100A and second mobile phone 100B may allow acceptance (allow transmission) of the hand-drawing image input, regardless of whether the first instruction has been accepted or not (regardless of whether transmitting/receiving start information).

In addition to the exemplary application set forth above, first mobile phone 100A and second mobile phone 100B may determine that initiating input of a hand-drawing image, i.e. the contact of stylus pen 120 with touch panel 102, is the first instruction. Alternatively, first mobile phone 100A and second mobile phone 100B may take the depression of the hand-drawing input start button on touch panel 102 as the input of a first instruction.

Then, first mobile phone 100A and second mobile phone 100B may determine that ending input of a hand-drawing image, i.e. the lift-off of stylus pen 120 from touch panel 102, is the second instruction. Alternatively, first mobile phone 100A and second mobile phone 100B may take the depression of the hand-drawing input end button on touch panel 102 as the input of a second instruction.

Thus, when any communication terminal accepts a start instruction of a hand-drawing image input at network system 1 of the present embodiment, contents server 600 temporarily stops reproduction of the motion picture contents at all communication terminals currently in a chat communication. Then, when any of the communication terminals accepts an end instruction of a hand-drawing image input, all the communication terminals currently in a chat communication resume the reproduction of the motion picture contents.

Thus, all the users currently in a chat communication can transmit and receive a hand-drawing image while viewing the same scene. In other words, the possibility of undesirable scene switching during input of a hand-drawing image and/or first mobile phone 100A and second mobile phone 100B displaying different scenes during input of a hand-drawing image can be reduced at network system 1 of the present embodiment.

<Chat Communication Processing at Network System>

Figure 20:
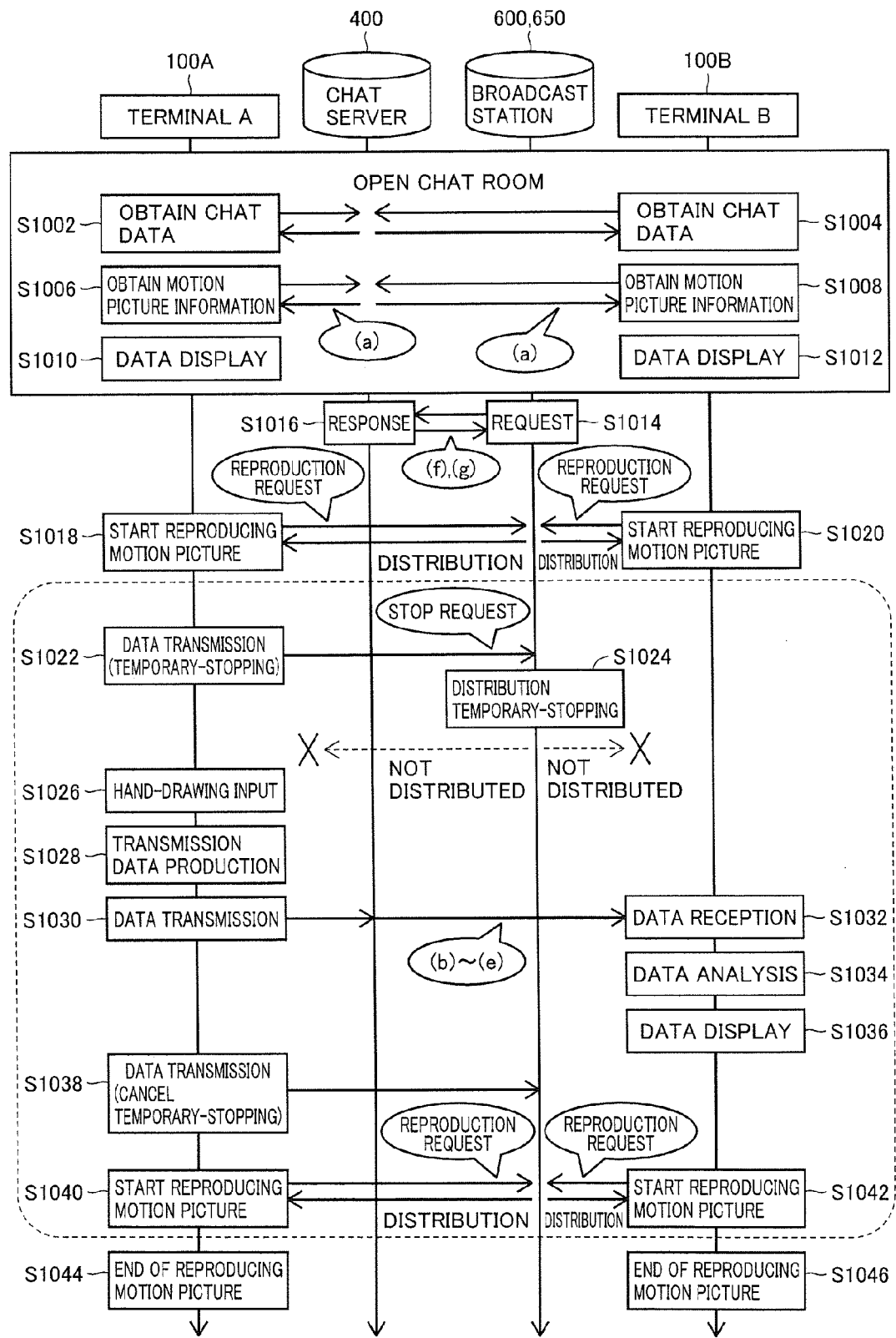
FIG. 20 is a flowchart of the procedure of P2P communication processing at the mobile phone according to the second embodiment.

Chat communication processing at the network system according to the present embodiment will be described hereinafter. FIG. 20 is a flowchart of the procedure of chat communication processing at the network system according to the present embodiment. FIG. 21 is a pictorial representation of a data structure of transmission data according to the present embodiment.

The case where first mobile phone 100A transmits hand-drawing data to second mobile phone 100B will be described hereinafter. First mobile phone 100A and second mobile phone 100B function to transmit/receive data via chat server 400, or through P2P communication without the intervention of chat server 400, after a chat room is opened.

Referring to FIG. 20, CPU 106 of first mobile phone 100A (transmission side) obtains data associated with chat communication from chat server 400 via communication device 101 (step S1002). Similarly, CPU 106 of second mobile phone 100B (recipient side) obtains data associated with chat communication from chat server 400 via communication device 101 (step S1004).

As used herein, "data associated with chat communication" includes the chat room ID, member's terminal information, notification (notice information), the chat contents up to the present time, and the like.

CPU 106 of first mobile phone 100A obtains motion picture information (a) to identify motion picture contents from the chat server via communication device 101 (step S1006). As shown in FIG. 21, motion picture information (a) includes the broadcast station code, the broadcasting time, and the like to identify a TV program, for example. Alternatively, motion picture information (a) includes the URL or the like indicating the stored location of the motion picture. In the present embodiment, CPU 106 of one of first mobile phone 100A and second mobile phone 100B transmits motion picture information to chat server 400 via communication device 101.

CPU 106 of the other of first mobile phone 100A and second mobile phone 100B receives the motion picture information from chat server 400 via communication device 101 (step S1008). Although the present example is based on the case where first mobile phone 100A and second mobile phone 100B obtain motion picture information during a chat communication, the present invention is not limited thereto. First mobile phone 100A and second mobile phone 100B may obtain common motion picture information prior to a chat communication.

CPU 106 of first mobile phone 100A causes touch panel 102 to display a window for reproducing motion picture contents (step S1010). Similarly, CPU 106 of second mobile phone 100B causes touch panel 102 to display a window for reproducing motion picture contents (step S1012).

Contents server 600 requests chat server 400 for member information associated with the chat in which first mobile phone 100A and second mobile phone 100B are participating (step S1014). Chat server 400 returns terminal information to contents server 600 according to the request (step S1016).

As shown in FIG. 21, the terminal information includes member information (f) and destination information (g). Member information (f) includes, for example, the chat room name or the like assigned by chat server 400. Destination information (g) includes the IP address or the like of first mobile phone 100A or second mobile phone 100B that is the distribution required terminal.

CPU 106 of first mobile phone 100A begins to receive motion picture contents (for example, streaming data) via communication device 101 based on motion picture information. CPU 106 begins to reproduce the motion picture contents via touch panel 102 (step S1018). CPU 106 may output the sound of the motion picture contents via speaker 109.

CPU 106 of second mobile phone 100B begins to receive motion picture contents identical to that of first mobile phone 100A via communication device 101 based on the motion picture information. CPU 106 begins to reproduce the motion picture contents via touch panel 102 (step S1020). CPU 106 may output the sound of the motion picture contents via speaker 109.

When the user of first mobile phone 100A depresses the hand-drawing start button, or when stylus pen 120 touches touch panel 102, CPU 106 of first mobile phone 100A transmits a hand-drawing start message to contents server 600 via communication device 101 (step S1022). CPU 605 of contents server 600 receives the hand-drawing start message and stops distribution of the motion picture contents (step S1024).

In other words, when a hand-drawing start message is received, CPU 605 of contents server 600 transmits data to first mobile phone 100A and second mobile phone 100B such that reproduction of the motion picture contents at first mobile phone 100A and second mobile phone 100B is temporarily stopped. The procession of the motion picture contents seems to be stopped for the user of first mobile phone 100A and the user of second mobile phone 100B. Reproduction of motion picture contents may be temporarily stopped by contents server 600 transmitting data requesting reproduction to be stopped to each terminal, or by contents server 600 stopping the distribution of motion picture contents to each terminal.

CPU 106 of first mobile phone 100A accepts input of a hand-drawing image from the user via touch panel 102 (step S1026). In more detail, CPU 106 obtains the change of the contacting position (trace) on touch panel 102 by sequentially accepting the contact coordinate data from touch panel 102 at every predetermined time. As shown in FIG. 21, CPU 106 generates transmission data including hand-drawing clear information (b), information (c) indicating the trace of the touching position, information (d) indicating the line color, and information (e) indicating the line width (step S1028).

Hand-drawing clear information (b) includes information (true) for clearing the hand-drawing input up to that time or information (false) for continuing hand-drawing input. At this stage, CPU 106 causes the hand-drawing image to be displayed on the motion picture contents (overlapping with motion picture contents) at display 107.

CPU 106 transmits the transmission data to second mobile phone 100B via communication device 101 (step S1030). CPU 106 of second mobile phone 100B receives the transmission data from first mobile phone 100A via communication device 101 (step S1032).

First mobile phone 100A may transmit the transmission data to second mobile phone 100B via chat server 400. Chat server 400 may store the transmission data to be transmitted/received by first mobile phone 100A or second mobile phone 100B.

CPU 106 analyzes the transmission data (step S1034). CPU 106 causes the hand-drawing image to be displayed on the motion picture contents (overlapping with motion picture contents) at display 107, based on the transmission data (step S1036).

When the user of first mobile phone 100A depresses the hand-drawing end button or when stylus pen 120 is lifted off from touch panel 102, CPU 106 of first mobile phone 100A transmits a hand-drawing end message to contents server 600 via communication device 101 (step S1038). CPU 605 of contents server 600 receives the hand-drawing end message to resume distribution of the motion picture contents.

In other words, upon receiving the hand-drawing end message, CPU 605 of contents server 600 begins to transmit to first mobile phone 100A and second mobile phone 100B streaming data that resumes the reproduction of motion picture contents at first mobile phone 100A and second mobile phone 100B. It seems to the user of first mobile phone 100A and the user of second mobile phone 100B that the procession of the motion picture contents is resumed (step S1040, step S1042).

When the reproduction of motion picture contents identified by the motion picture information ends, CPU 106 of first mobile phone 100A closes the window for motion picture contents (step S1050). When the reproduction of the motion picture contents identified by the motion picture information ends, CPU 106 of second mobile phone 100B closes the window for motion picture contents (step S1052).

(Modification of Chat Communication Processing at Network System)

A modification of chat communication processing at the network system according to the present embodiment will be described hereinafter. FIG. 22 is a flowchart of the procedure of a modification of chat communication processing at the network system according to the present embodiment.

In the aforementioned FIG. 20, contents server 600 functions to request chat server 400 for the terminal information. However, as shown in FIG. 22, contents server 600 may accept terminal information from each of first mobile phone 100A and second mobile phone 100B.

In more detail, step S1019 and step S1021 may be executed instead of step S1016, step S1018, step S1020, and step S1022 in FIG. 20.

CPU 106 of first mobile phone 100A may begin to receive motion picture contents (for example, streaming data) by transmitting the terminal information of first mobile phone 100A to contents server 600 based on the motion picture information (step S1019). CPU 106 may output the sound of the motion picture contents via speaker 109.

In a similar manner, CPU 106 of second mobile phone 100B may begin to receive motion picture contents (for example, streaming data), by transmitting the terminal information of second mobile phone 100B to contents server 600 based on the motion picture information (step S1021). CPU 106 may output the sound of the motion picture contents via speaker 109.

As shown in FIG. 21, the terminal information includes member information (f) and distribution information (g). Member information (f) includes the name and the like of the chat room in which first mobile phone 100A and second mobile phone 100B are participating. Destination information (g) includes the IP address and the like of first mobile phone 100A or second mobile phone 100B that is the distribution requesting terminal.

<Motion Picture Contents Distribution Processing at Contents Server 600>

Figure 23:
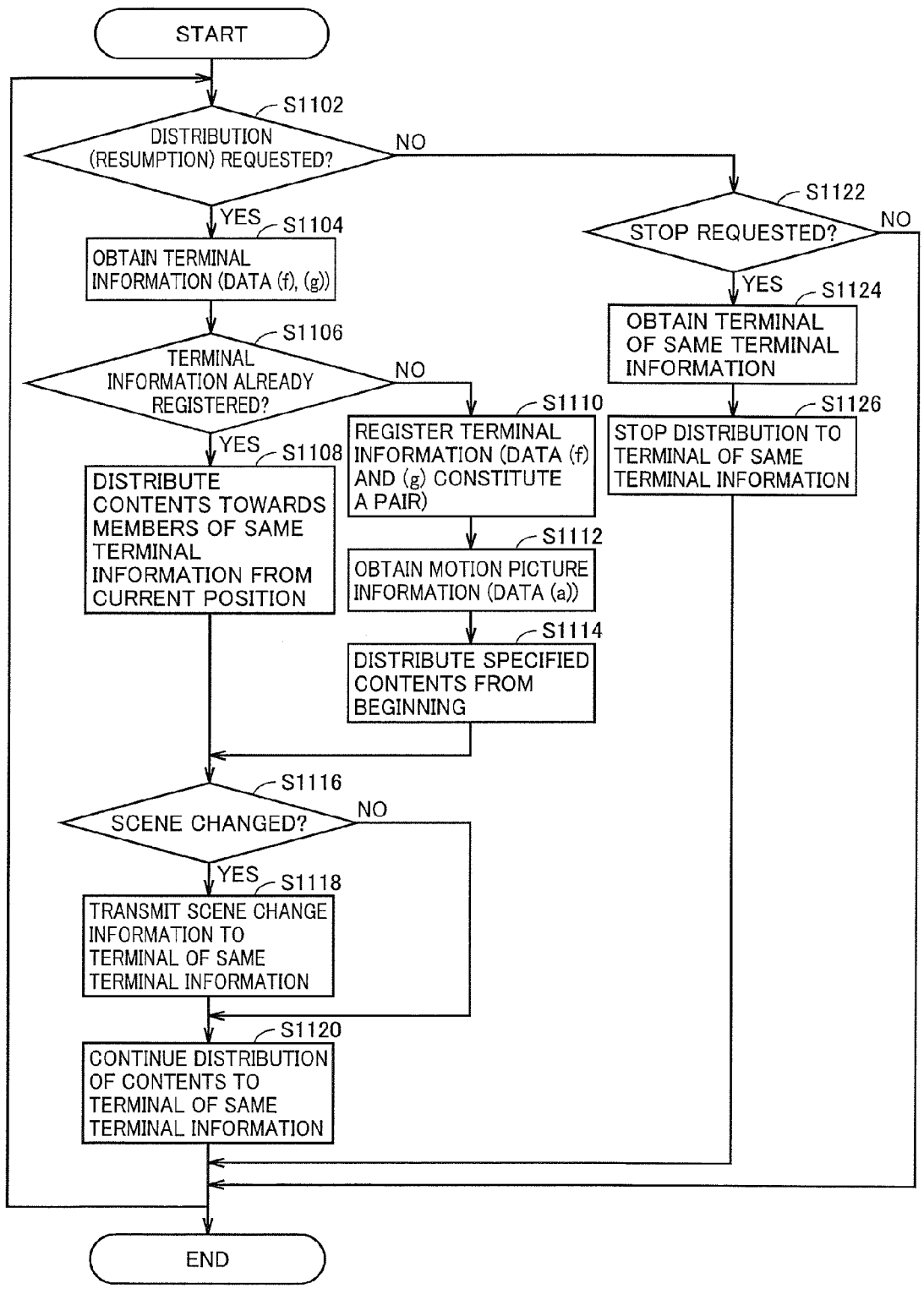
FIG. 23 is a flowchart of the procedure of communication processing at a contents server according to the second embodiment.

Motion picture contents distribution processing at contents server 600 according to the present embodiment will be described hereinafter. FIG. 23 is a flowchart of the procedure of motion picture contents distribution processing at contents server 600 according to the present embodiment.

Referring to FIG. 23, CPU 605 of contents server 600 determines whether a distribution request of motion picture contents from a communication terminal or a second instruction (hand-drawing input end message) is received or not via server communication device 609 (step S1102). In the case where a distribution request of motion picture contents is received from a communication terminal (YES at step S1102), CPU 605 obtains terminal information from chat server 400 or from the relevant communication terminal (step S1104).

CPU 605 refers to memory 606 to determine whether the relevant terminal information is already registered or not (step S1106). When the relevant terminal information is already registered at memory 606 (YES at step S1106), CPU 605 begins to distribute the contents distributed to members of the same terminal information, i.e. communication terminal entering the same chat room, from the current reproduction position (step S1108). Further, CPU 605 begins to distribute the motion picture contents from the latest stop position to all the members with the same terminal information. In other words, CPU 605 resumes the procession of motion picture contents. CPU 605 executes the processing from step S1116.

In contrast, when the relevant terminal information is not registered at memory 606 (NO at step S1106), CPU 605 registers the terminal information in memory 606 (step S1110). CPU 605 obtains the motion picture information (a) from the relevant communication terminal (step S1112). CPU 605 uses server communication device 609 to begin distributing the motion picture contents specified by motion picture information (step S1114).

CPU 605 determines whether the scene has changed or not based on the motion picture contents currently distributed (step S1116). When the scene has not changed (NO at step S1116), CPU 605 executes the processing from step S1120.

When the scene has changed (YES at step S1116), CPU 605 uses server communication device 609 to transmits scene change information to the communication terminal corresponding to the same terminal information (step S1118). Continuously, CPU 605 uses server communication device 609 to continue distributing motion picture contents to the communication terminal corresponding to the same terminal information (step S1120). CPU 605 repeats the processing from step S1120.

When CPU 605 does not accept a distribution request of motion picture contents from a communication terminal (NO at step S1102), CPU 605 determines whether a stop request of motion picture contents or first instruction (start message of hand-writing input) from the communication terminal has been accepted or not (step S1122). In the case where a stop request of motion picture contents is not received from the communication terminal (NO at step S1122), the processing from step S1102 is repeated.

In the case where a stop request of motion picture contents is accepted from the communication terminal (YES at step S1122), CPU 605 refers to memory 606 to identify the communication terminal corresponding to the same terminal information (step S1124). CPU 605 stops the distribution of motion picture contents to a communication terminal corresponding to the same terminal information (step S1126). Alternatively, CPU 605 stops the procession of the motion picture contents currently distributed to a communication terminal corresponding to the same terminal information. CPU S605 repeats the processing from step S1102.

Since the input processing at cellular phone 100, the pen information setting processing at cellular phone 100, the hand-drawing processing at cellular phone 100, the display processing at cellular phone 100, the exemplary application of display processing at cellular phone 100, the hand-drawing image display processing at cellular phone 100, and the hand-drawing image display processing at cellular phone 100 are similar to those of the first embodiment, description thereof will not be repeated.

<Another Exemplary Application of Network System 1>

The present invention can also be applied to the case where the present invention is achieved by supplying a program to a system or device. The advantage of the present invention can be enjoyed by supplying a storage medium in which is stored the program represented by software for achieving the present invention to a system or device, and a computer (or CPU or MPU) of that system or device reading out and executing the program codes stored in the storage medium.

In this case, the program codes per se read out from the storage medium will implement the function of the embodiments set forth above, and the storage medium storing the programs codes will constitute the present invention.

For a storage medium to supply the program code, a hard disk, optical disk, magneto optical disk, CD-ROM, CD-R, magnetic tape, non-volatile memory card (IC memory card), ROM (mask ROM, flash EEPROM and the like), for example, may be used.

In addition to realizing the functions of the embodiments set forth above by executing program codes read out by a computer, the functions of the embodiments described above may be realized by a process according to an OS (Operating System) running on the computer performing a part of or all of the actual process, based on the commands of the relevant program codes.

Further, the program codes read out from a storage medium may be written to a memory included in a functionality expansion board inserted to a computer or a functionality expansion unit connected to a computer. Then, the functions of the embodiments described above may be realized by a process according to a CPU or the like provided on the functionality expansion board or the functionality expansion unit, performing a part of or all of the actual process, based on the commands of the relevant program codes.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST 1 network system; 100, 100A, 100B, 100C, 100D mobile phone; 101 communication device; 102 touch panel; 103 memory; 103A work memory; 103B address book data; 103C self-terminal data; 103D address data; 103E address data; 104 pen tablet; 106 CPU; 107 display; 108 microphone; 109 speaker; 110 various-type button; 111 first notification unit; 112 second notification unit; 113 TV antenna; 120 stylus pen; 200 car navigation device; 250 vehicle; 300 personal computer; 400 chat server; 406 memory; 406A room management table; 407 hard disk; 408 internal bus; 409 server communication device; 500 Internet; 600 contents server; 606 memory; 607 hard disk; 608 internal bus; 609 server communication device; 615 hard disk; 700 carrier network.

The invention claimed is:

1. A network system comprising first and second communication terminals, said first communication terminal capable of obtaining externally-applied contents, and including:

a touch panel;
a first communication device for communicating with said second communication terminal; and
a first processor for reproducing said contents using said touch panel, temporarily stopping the reproduction of said contents and transmitting a stop instruction to said second communication terminal according to a first input, and resuming the reproduction of said contents and transmitting a resumption instruction to said second communication terminal according to a second input,
said second communication terminal capable of obtaining said externally-applied contents, and including:
a display;
a second communication device for communicating said first communication terminal; and
a second processor for reproducing said contents using said display, temporarily stopping the reproduction of said contents according to said stop instruction from said first communication terminal, and resuming the reproduction of said contents according to said resumption instruction from said first communication terminal, wherein
said first processor is configured to:
during temporary-stopping of said contents, accept input of a hand-drawing image using said touch panel, display said hand-drawing image on said contents using said touch panel, and transmit said hand-drawing image to said second communication terminal via said first communication device; and
delete said hand-drawing image when a determination is made that a scene of said contents has changed during reproduction of said contents.

2. The network system according to claim 1, wherein said second processor is configured to, during temporary-stopping of said contents, receive the hand-drawing image from said first communication terminal via said second communication device, and display said hand-drawing image on said contents using said display.

3. The network system according to claim 1, wherein said first processor is configured to:
sense that an external object has touched said touch panel, and accept the touch operation as said first input; and
sense lift-off of said external object from said touch panel to accept the lift-off operation as said second input.

4. The network system according to claim 1, wherein
said first communication terminal further includes a first memory,
said first processor is configured to:
store said obtained contents in said first memory; and
resume the reproduction of said contents from a temporary-stopped position according to said second input,
said second communication terminal further includes a second memory,
said second processor is configured to:
store said obtained contents in said second memory; and
resume the reproduction of said contents from said temporary-stopped position according to said resumption instruction.

5. The network system according to claim 1, wherein said stop instruction includes information indicating a temporary-stopped position of said contents.

6. The network system according to claim 1, wherein
said stop instruction includes information indicating a temporary-stopped time, and
said resumption instruction includes information indicating a temporary-stopped period.

7. A communication method at a network system including first and second communication terminals, said communication method comprising:
receiving, by said first communication device, externally-applied contents and reproducing said contents at a touch panel;
receiving, by said second communication terminal, said externally-applied contents, and reproducing said contents at a display;
temporarily stopping, by said first communication terminal, the reproduction of said contents, and transmitting a stop instruction to said second communication terminal according to a first input;
temporarily stopping, by said second communication terminal, the reproduction of said contents according to said stop instruction from said first communication terminal;
resuming, by said first communication terminal, the reproduction of said contents, and transmitting a resumption instruction to said second communication terminal according to a second input;
resuming, by said second communication terminal, the reproduction of said contents according to said resumption instruction from said first communication terminal;
during temporary-stopping of said contents, accepting, by said first communication terminal, input of a hand-drawing image using said touch panel, displaying said hand-drawing image on said contents using said touch panel, and transmitting said hand-drawing image to said second communication terminal; and
deleting, by said first communication terminal, said hand-drawing image when a determination is made that a scene of said contents has changed during reproduction of said contents.

8. A communication terminal capable of obtaining externally-applied contents, comprising:
a touch panel;
a communication device for communicating with an other communication terminal; and
a processor for reproducing said contents using said touch panel, temporarily stopping the reproduction of said contents and transmitting a stop instruction to said other communication terminal according to a first input, resuming the reproduction of said contents and transmitting a resumption instruction to said other communication terminal according to a second input, temporarily stopping the reproduction of said contents according to said stop instruction from said other communication terminal, and resuming the reproduction of said contents according to said resumption instruction from said other communication terminal, wherein
said processor is configured to:
during temporary-stopping of said contents, accept input of a first hand-drawing image using said touch panel, display said first hand-drawing image on said contents using said touch panel, and transmit said first hand-drawing image to said other communication terminal via said communication device,
delete said first hand-drawing image when a determination is made that a scene of said contents has changed during reproduction of said contents.

9. The communication terminal according to claim 8, wherein is configured to receive a second hand-drawing image from said other communication terminal via said communication device, and display said second hand-drawing image on said contents using said touch panel.

10. The communication terminal according to claim 8, wherein said processor is configured to:
    sense that an external object has touched said touch panel, and accept the touch operation as said first input; and
    sense lift-off of said external object from said touch panel to accept the lift-off operation as said second input.

11. The communication terminal according to claim 8, said communication terminal further including a memory,
    wherein said processor is configured to:
    store said received contents into said memory; and
    resume the reproduction of said contents from a temporary-stopped position according to said second input or said resumption instruction.

12. The communication terminal according to claim 8, wherein said stop instruction includes information indicating a temporary-stopped position of said contents.

13. The communication terminal according to claim 8, wherein
    said stop instruction includes information indicating a temporary-stopped time, and
    said resumption instruction includes information indicating a temporary-stopped period.

14. A communication method at a communication terminal including a touch panel, a processor, and a communication device, said communication method comprising:
    receiving, by said processor, externally-applied contents and reproducing said contents using said touch panel;
    temporarily stopping, by said processor, the reproduction of said contents and transmitting a stop instruction to an other communication terminal via said communication device according to a first input;
    resuming, by said processor, the reproduction of said contents and transmitting a resumption instruction to said other communication terminal via said communication device according to a second input;
    temporarily stopping, by said processor, the reproduction of said contents according to said stop instruction from said other communication terminal; and
    resuming, by said processor, the reproduction of said contents according to said resumption instruction from said other communication terminal,
    during temporary-stopping of said contents, accepting, by said processor, input of a hand-drawing image using said touch panel, displaying said hand-drawing image on said contents using said touch panel, and transmitting said hand-drawing image to said other communication terminal via said communication device; and
    deleting, by said processor, said hand-drawing image when a determination is made that a scene of said contents has changed during reproduction of said contents.

\* \* \* \* \*